(12) United States Patent  (10) Patent No.: US 7,570,790 B2
Tsujii et al.  (45) Date of Patent: Aug. 4, 2009

(54) IMAGE PROCESSING METHOD AND APPARATUS FOR ACQUIRING HIGHER RESOLUTION IMAGE DATA FOR A REGION OF INTEREST FROM A DATA STREAM

(75) Inventors: Osamu Tsujii, Tochigi (JP); Makoto Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 536 days.

(21) Appl. No.: 11/143,714

(22) Filed: Jun. 3, 2005

(65) Prior Publication Data

US 2005/0213802 A1  Sep. 29, 2005

Related U.S. Application Data

(62) Division of application No. 10/132,205, filed on Apr. 26, 2002, now Pat. No. 7,031,506.

(30) Foreign Application Priority Data

Apr. 27, 2001 (JP) ............................. 2001-132930

(51) Int. Cl.
*G06K 9/00* (2006.01)
*G06K 9/32* (2006.01)
*G09G 5/02* (2006.01)

(52) U.S. Cl. ..................... 382/128; 382/299; 345/698

(58) Field of Classification Search .................. None
See application file for complete search history.

(56) References Cited

U.S. PATENT DOCUMENTS

| 4,258,264 A | 3/1981 | Kotera et al. |
| 4,797,945 A | 1/1989 | Suzuki et al. |
| 5,065,446 A | 11/1991 | Suzuki et al. |
| 6,246,780 B1 | 6/2001 | Sato |
| 6,337,929 B1 | 1/2002 | Kajiwara et al. |
| 6,472,665 B1 | 10/2002 | Ishisaka et al. |
| 6,496,607 B1 | 12/2002 | Krishnamurthy et al. |

(Continued)

FOREIGN PATENT DOCUMENTS

| JP | 55-12429 | 1/1980 |
| JP | 56-11395 | 2/1981 |

OTHER PUBLICATIONS

Tsujii, O., et al. "Lung contour detection in chest radiographs using 1-D convolution neural networks", Journal of Electronic Imaging, vol. 8(1), Jan. 1999.

(Continued)

*Primary Examiner*—Charles Kim
(74) *Attorney, Agent, or Firm*—Fitzpatrick, Cella, Harper & Scinto

(57) ABSTRACT

An apparatus having image processing function performs image processing method. In the image processing method, a first portion of data is acquired as a data stream obtained from image data that has been sequentially converted and encoded, then the acquired data is decoded to obtain a two-dimensional image. The two-dimensional image is analyzed to determine a region of interest within the two-dimensional image. Then, a second portion of data is acquired as a data stream obtained from the image data based on the region of interest. Thus, areas that are useful to the diagnosis can be displayed promptly and in detail.

18 Claims, 21 Drawing Sheets

U.S. PATENT DOCUMENTS

| | | | |
|---|---|---|---|
| 6,983,063 B1* | 1/2006 | Novak et al. | 382/131 |
| 2002/0099569 A1 | 7/2002 | Thirsk | |
| 2003/0005140 A1* | 1/2003 | Dekel et al. | 709/231 |
| 2005/0002547 A1 | 1/2005 | Torre-Bueno | |

OTHER PUBLICATIONS

McNitt-Gray, M.F., et al., "Feature Selection in the Pattern Classification Problem of Digital Chest Radiograph Segmentation", IEEE Transactions on Medical Imaging, vol. 14, No. 3, Sep. 1995.

Jain, A.K., "Fundamentals of Digital Image Processing", University of California, Davis, Prentice Hall, 1989, pp. 150-155, 162-175, 381-390.

Rumelhart, D.E., et al., "Learning Internal Representations by Error Propagation", Parallel Distributed Processing, Explorations in the Microstructure of Cognition, vol. 1, Foundations, Chapter 8, The Massachusetts Institute of Technology, 1986.

Bishop, C., "Improving the Generalization Properties of Radial Basis Function Neural Networks", Neural Computation 3, Massachusetts Institute of Technology, 1991, pp. 579-588.

Tsujii, O., et al., "Automated segmentation of anatomic regions in chest radiographs using an adaptive-sized hybrid neural network", Med. Phys. 25 (6), Jun. 1998.

Katsuragawa, S., et al., "Computer-Aided Diagnosis of Interstitial Lung Diseases", Japan Radiological Society Journal 50, pp. 753-766 (1990).

Sasaki, Y., et al., "Quantitative Analysis of Pneumoconiosis in Standard Chest Radiographs", Japan Radiological Society Journal 52, pp. 1385-1393 (1992).

\* cited by examiner

POSITIVE AREA (EXAMPLE)

DETERMINATION MEANS OUTPUT (EXAMPLE)

SHADOW CANDIDATE IMAGE (EXAMPLE)

CHEST FRONTAL IMAGE (EXAMPLE)

F I G. 13A
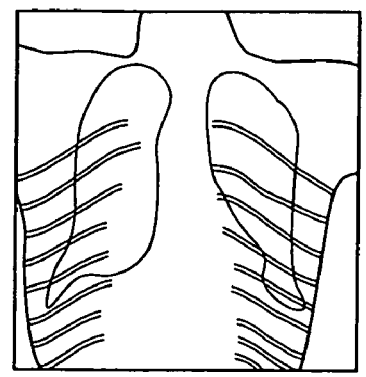
CHEST FRONTAL IMAGE
(EXAMPLE)
F I G. 13B
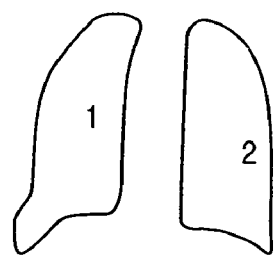
MANUAL SEGMENTATION
MEANS LEARNING DATA
(EXAMPLE)
F I G. 13C
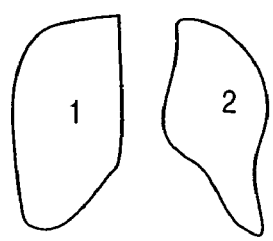
SEGMENTATION OUTPUT IMAGE
(EXAMPLE)

CHEST FRONTAL IMAGE
(EXAMPLE)

SEGMENTATION OUTPUT

TEXTURE DISEASE CANDIDATE ROI
AND POSITIVE AREA ROI

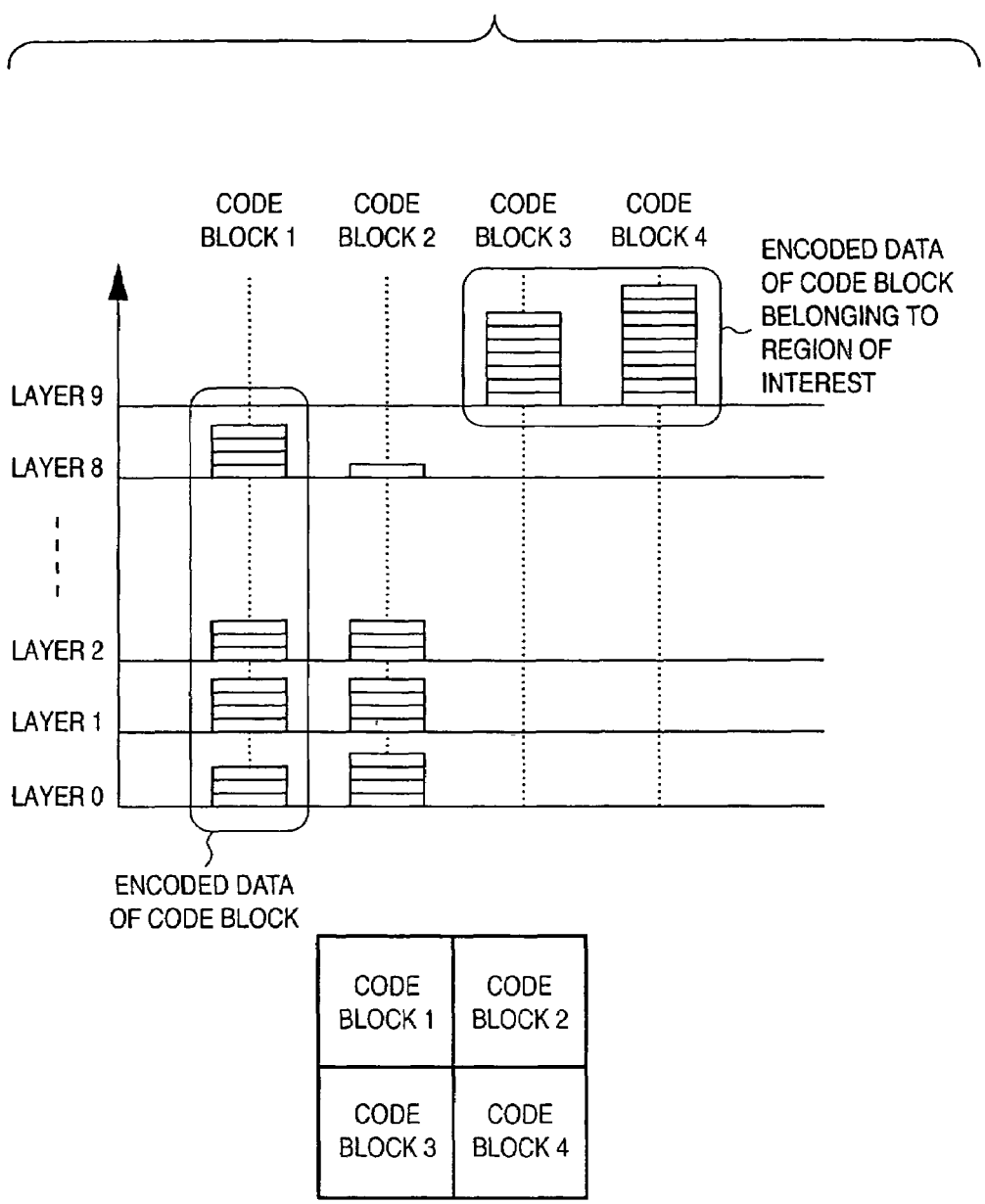

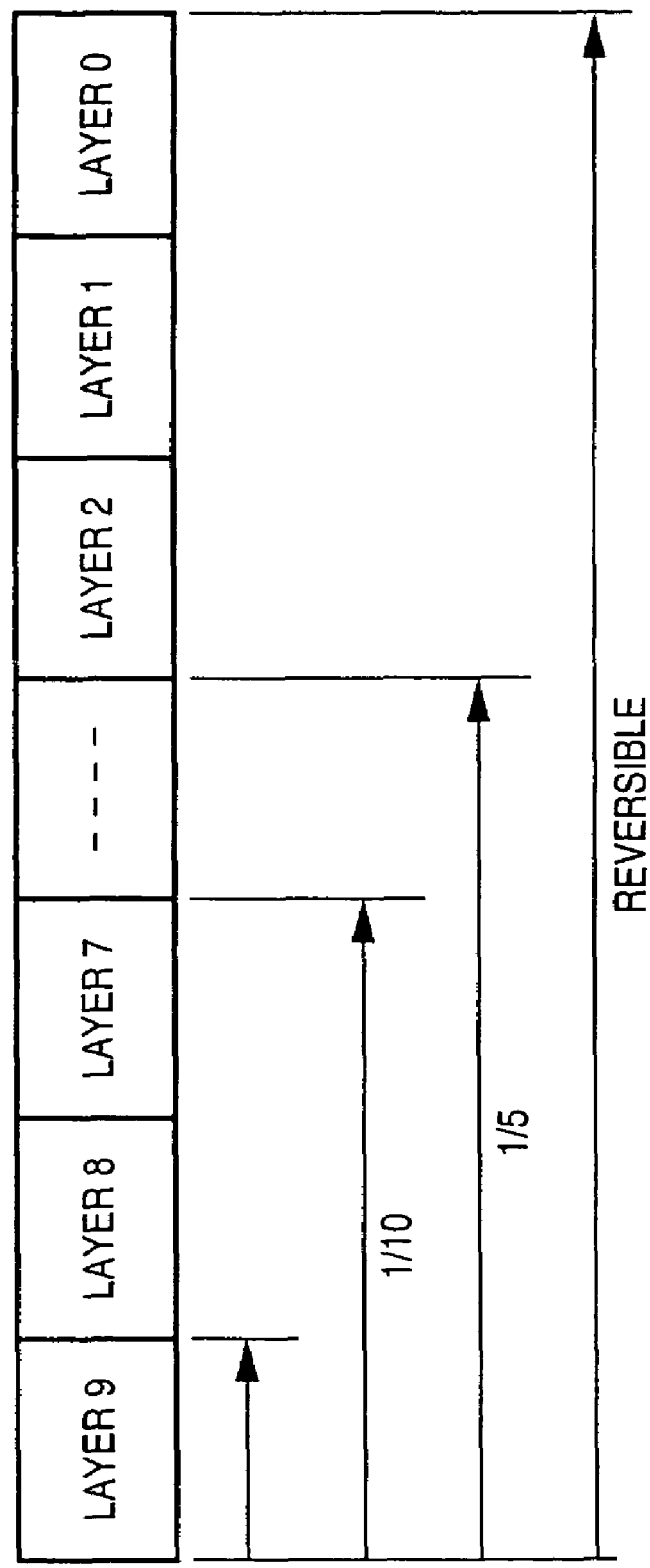

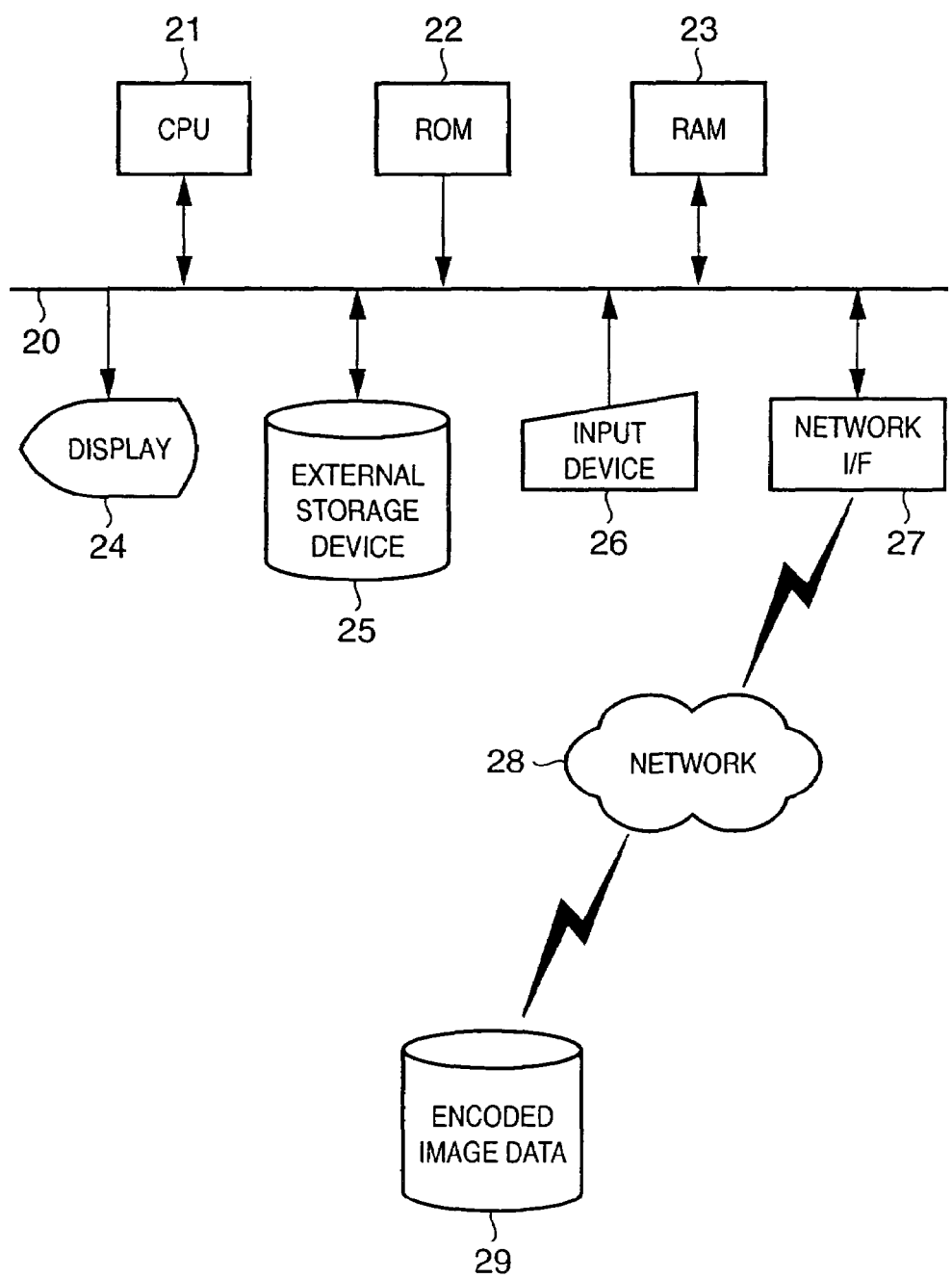

CODE BLOCK BELONGING TO REGION OF INTEREST

REGION OF INTEREST

IMAGE PROCESSING METHOD AND APPARATUS FOR ACQUIRING HIGHER RESOLUTION IMAGE DATA FOR A REGION OF INTEREST FROM A DATA STREAM

This application is a division of application Ser. No. 10/132,205 filed Apr. 26, 2002.

FIELD OF THE INVENTION

The present invention relates to an apparatus and method having an image processing function, and more particularly, to an apparatus and method having an image processing function for medical X-ray images.

BACKGROUND OF THE INVENTION

It is well known that certain types of fluorescent materials, when exposed to radiation—whether X rays, alpha rays, beta rays, gamma rays, electron beams or ultraviolet light—store a certain portion of the energy with which they are irradiated so that, when irradiated with visible or other excitation light, these fluorescent materials undergo accelerated phosphorescence. Such materials are called photostimulable phosphors.

In Japanese Laid-Open Patent Application Nos. 55-12429, 56-11395 and the like, radiation image information recording and reproduction systems that utilize this photostimulable phosphors have been proposed. According to such systems, radiation image information from a human body or other object exposed to radiation is first recorded on a photostimulable phosphor sheet. The photostimulable phosphor sheet is then exposed to a laser beam or other excitation light, causing the photostimulable phosphor sheet to undergo accelerated phosphorescence. The accelerated phosphorescence is then read photoelectrically to acquire image signals, which are then used to make visible a radiation image of the irradiated object by displaying it on a photosensitive recording medium, CRT or the like.

Recently, apparatuses that use semiconductor sensors similarly to take X-ray images have been developed. Systems such as these have the practical advantage of being able to record images over a considerably wider range of radiation exposures than radiation photo systems using silver chloride film can do. In other words, such systems can provide visible radiation images unaffected by fluctuations in radiation exposure amounts, by acquiring X rays over an extremely broad dynamic range using photoelectric conversion means, converting the acquired X rays into electrical signals, and using the electrical signals to output a visible image to a photosensitive recording medium, CRT or other display apparatus.

The electrical signals acquired as described above can be converted into digital information, and the digital information so obtained can be stored in a storage medium such as a memory. This type of digital information can then be supplied to an information processing apparatus for digital image processing, in order to provide various types of diagnostic support.

However, X-ray images contain a large amount of information, so storing and transmitting such images involves very large volumes of data. Advanced encoding is used to reduce the tremendous volumes of data involves in storing and receiving such X-ray images, by eliminating the image redundancy or by altering the image content so as to degrade the image by an amount still not easily discernible to the naked eye.

Thus, for example, in the Joint Photographic Experts Group (JPEG) standard recommended by the International Standard Organization (ISO) and International Telecommunication Union (ITU) as the international standard coding method for still pictures, Differential Pulse Code Modulation (DPCM) is used for reversible compression and Discrete Cosine Transform (DCT) is used for non-reversible compression. A detailed explanation of JPEG is provided in ITU-T Recommendation T.81, ISO/IEC (International Electrotechnical Commission) 10918-1 and so will be omitted here.

Additionally, much recent research has concentrated on compression methods using Discrete Wavelet Transform (DWT). The advantage of DWT is that the blocking artifacts seen with DCT do not appear.

On the other hand, it is possible to improve the efficiency of compression when compressing an X-ray image by determining an area of interest within the image and reducing the data compression ratio for that area so as to provide superior picture quality for it. Also, when performing lossless coding as well, it is possible to priority code an area of interest (hereinafter sometimes referred to as AOI) and then priority decode that same area when reading out the image. However, the determination of an AOI is not an easy choice to make, involving as it does a medical judgment.

With these considerations in mind, the applicant has proposed a method (and apparatus) that, when an image is compressed, analyzes an input image to extract the X-ray radiation field area, then further extracts an X-ray pass-through region from the extracted radiation field area, sets the area of interest as that part of the radiation field area other than the pass-through region, level-shifts and codes the image corresponding to the area of interest so as to priority code the area of interest. The problem with this method is that the pass-through region within the carved-out image (that is, the radiation field area) constitutes approximately 20 percent of the field, so in order to improve the data compression ratio the AOI must be narrowed further.

Additionally, there are many instances in which it is useful to set the area of interest when displaying the contents of the compressed image file. For example, displaying one or more images composed of 2,000×2,000 pixels on a monitor of 1,000×1,000 pixels involves a choice between either displaying only a portion of one image or displaying reduced image(s). Of course, it is possible to display the entire unreduced image and simply scroll down the screen using a mouse or a track ball, but such an expedient will not achieve the objective of simultaneously displaying a plurality of images. It is possible to display only the AOI if the AOI is set for the images when the images are being filed, but if there is no AOI, or if the AOI has been set but overflows its allotted space, in either case it is necessary to use a reduced display.

A reduced display creates its own problems, insofar as such display has poor spatial reduction capabilities, which can make detailed inspection of an image impossible. Techniques have been proposed to compensate for this defect, for example, use of a normalized rectangle or circular magnifying lens that an operator (a physician) moves across the top of the CRT so as to partially display the original subject. However, the problem remains as to whether or not it is possible to select appropriately an area to enlarge, given that such display has poor spatial resolution capabilities.

It is also sometimes the case that X-ray images are encoded before storage so as to reduce the volume of data involved, but it is preferable that such encoded images be displayed promptly, without delay. The ability to display such encoded images promptly makes it possible also to priority display an area useful to the diagnosis from the encoded image data.

SUMMARY OF THE INVENTION

Accordingly, the present invention has as its object to provide an apparatus and a method having an image processing function that solve the above-described problems of the conventional art.

Another and more specific object of the present invention is to make it possible to expedite display of an area useful to a diagnosis from encoded image data.

Still another and more specific object of the present invention is to make it possible to expedite reading of an area of interest (AOI) important to the diagnosis or observation as determined by a diagnostic support means and to improve the image quality of that area, so as to efficiently improve the accuracy of diagnostic support.

Still another, further and more specific object of the present invention is to make it possible to acquire image data with an image quality suited to the objective of the diagnostic support and to achieve efficient image transmission.

The above-described objects of the present invention are achieved by an image processing apparatus comprising:

first acquisition means for acquiring a first portion of a data stream obtained from image data that has been sequenced, converted and encoded;

decoding means for decoding the data stream acquired by the first acquisition means and obtaining a two-dimensional image;

analysis means for analyzing the two-dimensional image obtained by the decoding means and determining an area of interest within the two-dimensional image; and second acquisition means for acquiring a second portion selected from the data stream based on the area of interest determined by the analysis means.

Additionally, the above-described objects of the present invention are also achieved by an image processing method, comprising:

a first acquisition step for acquiring a first portion of a data stream obtained from image data that has been sequenced, converted and encoded;

a decoding step for decoding the data stream acquired in the first acquisition step and obtaining a two-dimensional image;

an analysis step for analyzing the two-dimensional image obtained in the decoding step and determining an area of interest within the two-dimensional image; and a second acquisition step for acquiring a second portion selected from the data stream based on the area of interest determined in the analysis step.

According to the above-described inventions, priority display an area useful to a diagnosis from encoded image data can be achieved.

Additionally, the above-described inventions make it possible to priority read an area of interest (AOI) important to the diagnosis or observation as determined by a diagnostic support means and to improve the quality of that image of that area, so as to effectively improve the accuracy of diagnostic support.

Additionally, the above-described inventions make it possible to acquire image data of an image quality suited to the objective of the diagnostic support and to achieve efficient image transmission.

Other objects, features and advantages of the present invention will become more apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 13A, 13B and 13C illustrate a process of segmentation;

FIG. 18 is a diagram illustrating a hypothetical layering of a JPEG2000 code sequence;

FIG. 19 is a diagram illustrating encoded data arranged in layers;

FIG. 20 is a block diagram of an image processing apparatus according to an embodiment of the present invention.

DETAILED DESCRIPTION OF THE PREFERRED EMBODIMENTS

Preferred embodiments of the present invention will now be described in detail, with reference to the accompanying drawings.

According to the following embodiments, an image processing apparatus which, upon reading coded X-ray medical image from a storage medium, automatically determines effective regions for diagnosis, reads data corresponding to the determined regions by priority, and displays the read data, will be explained.

Figure 1:
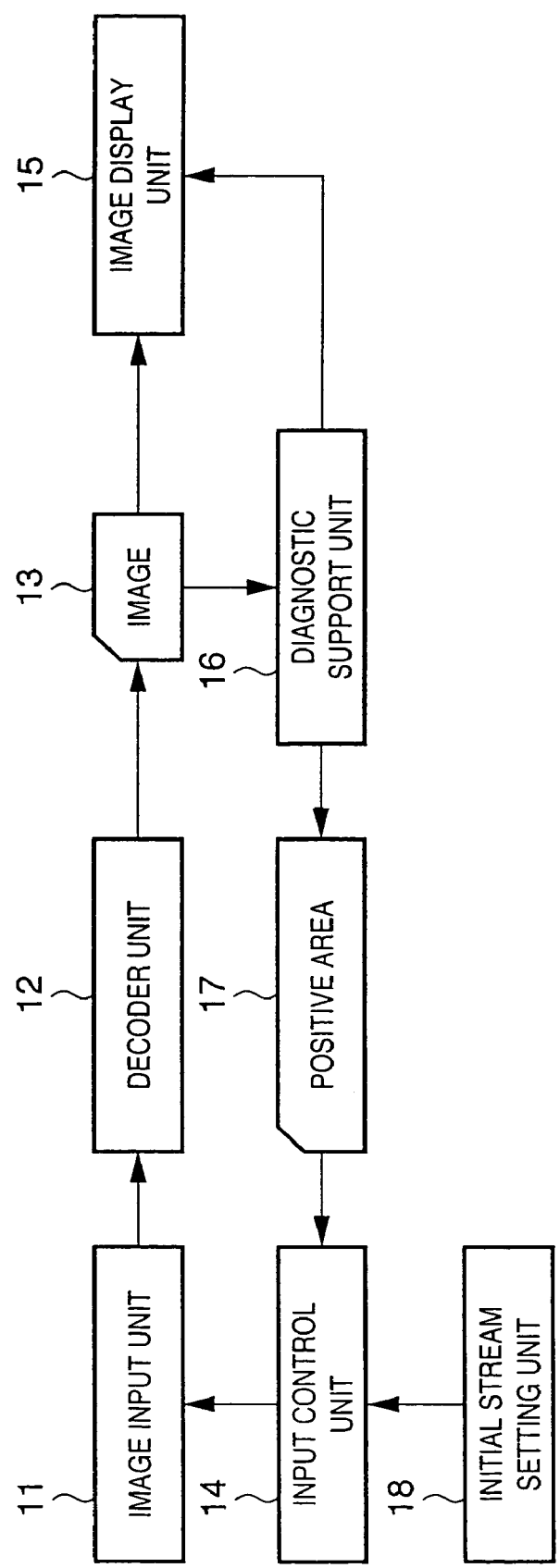
FIG. 1 is a block diagram of an image processing apparatus according to one embodiment of the present invention.

FIG. 1 is a block diagram for illustrating in general outline an image processing method as executed by an image processing apparatus according to one embodiment of the present invention. FIG. 20 is a is a block diagram of an image processing apparatus according to an embodiment of the present invention, designed to execute the image processing method described in FIG. 1. For convenience of explanation, a description will first be given of the image processing apparatus.

As shown in FIG. 20, the image processing apparatus according to one embodiment of the present invention comprises a central processing unit (CPU 21) that executes either a control program stored in a ROM 22 or a control program loaded into a RAM 23 from an external storage device. The ROM 22 stores not only the control program executed by the CPU 21 but also a variety of types of data to be described later. The RAM 23 provides not only a load space for the control program but also work space for the CPU 21.

Reference numeral 24 denotes a display unit, which displays a variety of screens according to commands issued by the CPU 21. Reference numeral 25 is an external storage device. The external storage device 25 may be a hard disk or similar storage medium. Reference numeral 26 denotes an input device, designed to accommodate operations performed by an operator the apparatus. The input device may be a keyboard or a mouse. Reference numeral 27 denotes a network interface, connected so as to enable communications with a network 28. The network may be a local area network (LAN), the internet, or the like. Reference numeral 20 is a bus. The bus 20 connects the above-described constituent parts to each other.

Reference numeral 29 is an image server for storing encoded image data. The image server 29 provides a data stream of sequentially converted and encoded image data.

In FIG. 1, reference numeral 11 denotes an image input unit, which presupposes input of encoded image data. It should be noted that the description that follows assumes a DWT-converted image is converted into an encoded stream and input. However, as can be appreciated by those of ordinary skill in the art, the present invention is not limited to DWT-converted images but is equally applicable to DCT and to KL sequentially converted images. In this specification, the encryption of source information, whether by DCT, KL conversion or DWT, is collectively referred to as sequential transformation. It should further be noted that DCT and KL conversion are common techniques, described in detail, for example, in Anil K. Jain, "Fundamentals of Digital Image Processing" (Prentice-Hall Inc., 1989).

The encoded image data is transmitted from the image server 29 connected to a network. The data input by the image input unit 11 is transmitted by a decoder unit 12. An ISO/IEC 15444 (hereinafter referred to as JPEG2000) is here used for the decoder unit 12 that decodes the DWT image, the details of which are described in detail in the published specifications thereof. An image 13 that is the output from the decoder unit 12 is displayed by an image display unit 15 and also provided to a diagnostic support unit 16. Alternatively, as can be appreciated by those of ordinary skill in the art, the image 13 may be fed directly to the diagnostic support unit 16.

It is important to understand here that the initial screen used for the diagnostic support unit 16 may be of a picture quality that satisfies the minimum requirements for the purposes of the diagnosis (sometimes hereinafter referred to as the diagnostic purpose) and that it is not necessary to read the entire data stream converted for diagnostic support. It should be noted that the minimum required picture quality for diagnostic purposes, in other words the configuration of the layering for coding, is fixed by an initial stream setting unit 18.

It should be noted that in the following description, which uses a frontal image of the chest portion of a human being in the detection of shaded areas (hereinafter shadows) indicative of possible tumors therein, in this instance a relatively low-resolution reduced image is sufficient for the diagnostic purpose. Accordingly, the initial stream setting unit 18 is set so that the partial data corresponding to the image is transmitted as the initial image. There are a plurality of types of diagnostic supports, and the quality of the initial image is determined by the type of diagnostic support to be performed by the system. Thus, for example, the detection of tumors, which are relatively large objects, does not require a very high degree of resolution, so a spatial reduction capability of approximately one fifth and a density reduction capability of one half may be used for the picture quality of the initial image.

On the other hand, a shadow like that of frosted glass requires a relatively high degree of resolution, so a spatial reduction capability of approximately one half and a density reduction capability of one third is set for the picture quality of the initial image. These initial settings are closely related to parameters set in the diagnostic support algorithm internal, and are determined by trial and error. When an image that satisfies the foregoing conditions is input, the diagnostic support unit 16 starts the diagnostic support process. If a further data stream is required during the process of diagnostic support, then data is input for the required area via an input control unit 14. An area 17 that is identified by the diagnostic support unit 16 as positive (hereinafter referred to as a positive area 17) is displayed as contour information overlaying the reduced image displayed on the image display unit 15 and provided to the input control unit 14.

Figure 2:
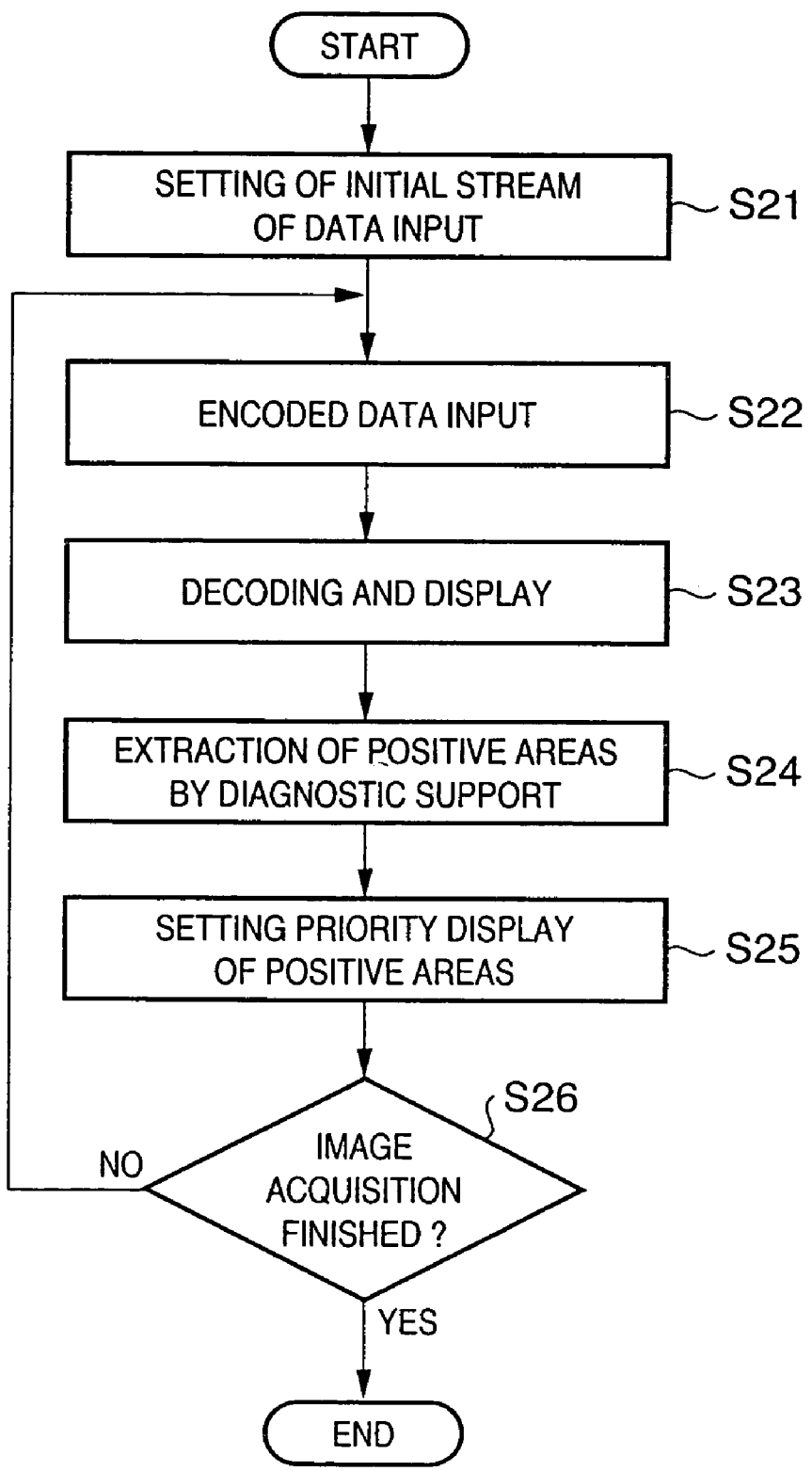
FIG. 2 is a flow chart illustrating operations of an image processing apparatus according to one embodiment of the present invention.

Summarizing the above-described operations reveals the following: FIG. 2 is a flow chart illustrating operations of an image processing apparatus according to one embodiment of the present invention. First, as shown in FIG. 2, in a step S21 an initial stream setting unit 18 sets the initial stream appropriate to the purpose of the diagnostic support. In a step S22, the image input unit 11 acquires encoded image data and sends the codes image data to the decoder unit 12. At this time, the input control unit 14 controls the image input unit 11 so that image data is input in accordance with the settings determined by the initial stream setting unit 18.

Then in a step S23, the encoded image data input by the image input unit 11 is decoded and the image data 13 obtained thereby is displayed by the image display unit 15. In a step S24, the diagnostic support unit 16 analyzes the decoded image data 13, checks the disease location on the patient's body, and outputs positive area data 17. In a step S25, the input control unit 14 determines which areas in the encoded image input in step S22 should be concentrated on for further analysis (hereinafter sometimes referred to as priority displayed), based on the positive area data 17 output from the diagnostic support unit 16. In a step S26 the process returns to step S22 if image data acquisition is not finished, at which point the input control unit 14 directs the image input unit 11 to acquire the encoded image in accordance with the area designated by the input control unit 14. The encoded image (or images) thus input by the image input unit 11 is (are) then decoded in order by the decoder unit 12 and displayed by the image display unit 15. The acquisition of further encoded image data helps to improve both the accuracy of the diagnostic support process of step S24 and the resolution of the image display in step S23.

The process described above results in the automatic selection from the encoded data of an area useful to the diagnosis, with this area of interest useful to the diagnosis being priority displayed for further analysis. Such automated priority display of the area of interest provides advantages similar to the prompt display of X-ray images.

A description will now be given of the diagnostic support unit 16.

Although the diagnostic support unit 16 performs different processes depending on the purpose of the diagnostic support, basically these processes can be divided into two major types: shadow-based diagnostic processes and texture disease diagnostic processes. The former include processed used in the detection of cancerous tumors and calcification as revealed in chest images or tumors as revealed in mammograms. The latter include processes used in the detection of interstitial pneumonia as revealed in chest images.

A description will first be given of shadow-based diagnostic support.

Figure 3:
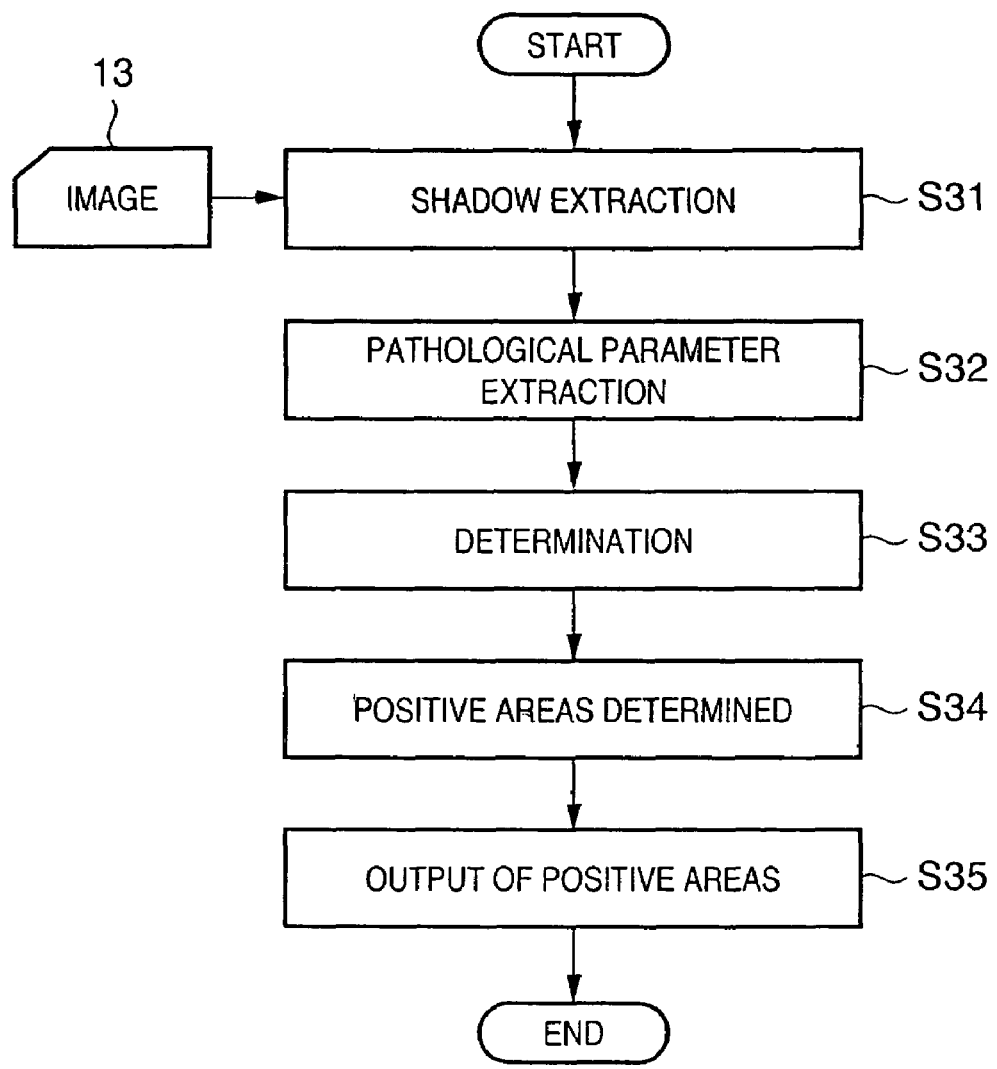
FIG. 3 is a flow chart illustrating steps in a shadow-based diagnostic support process.
Figure 4:
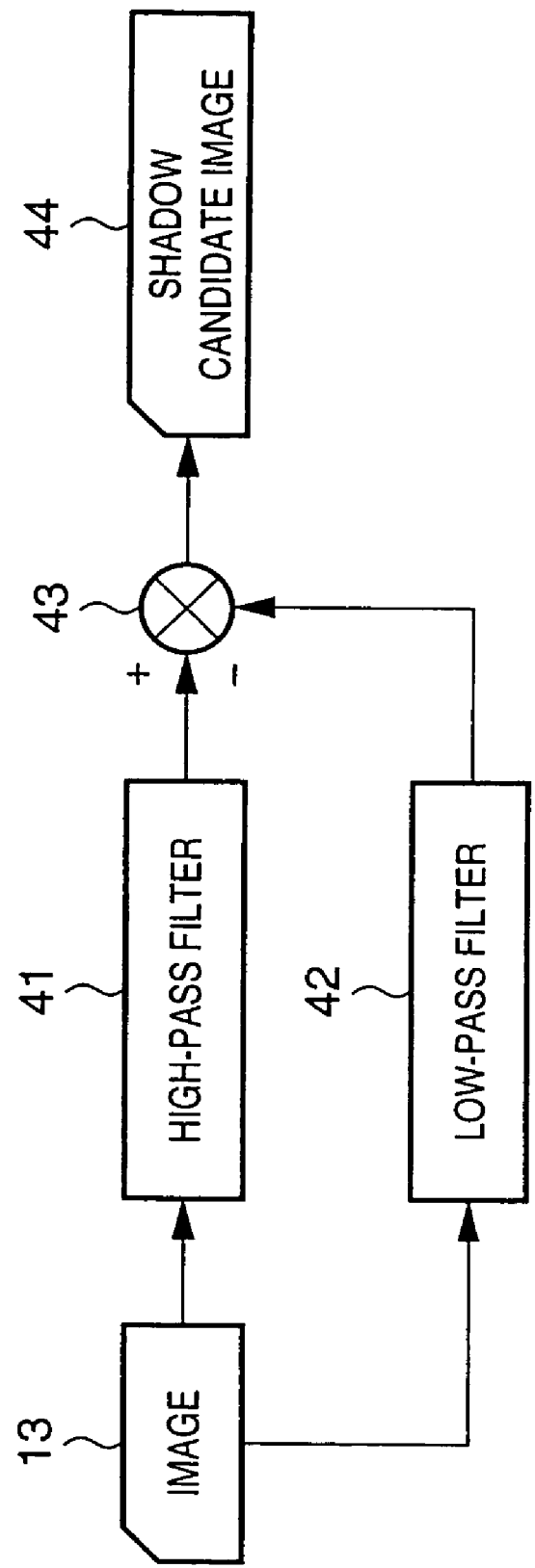
FIG. 4 is a block diagram showing an internal composition of a shadow extraction unit.
Figure 5:
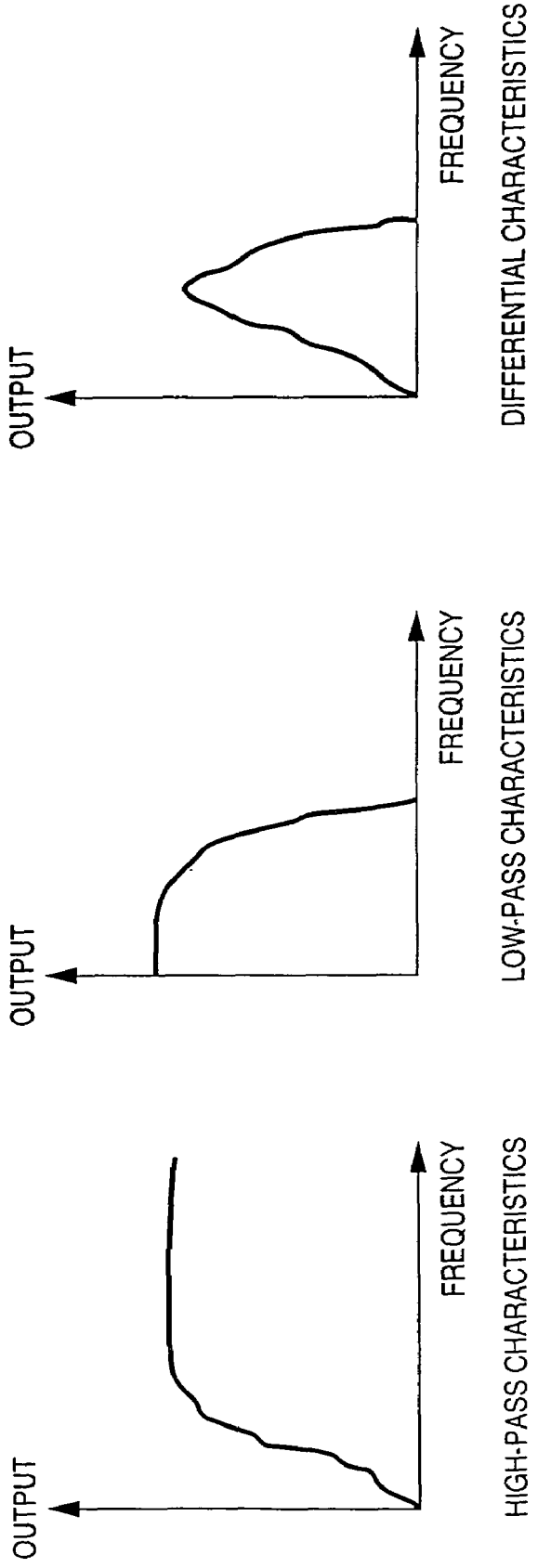
FIGS. 5A, 5B and 5C are diagrams illustrating characteristics of the shadow-extraction unit.
Figure 6:
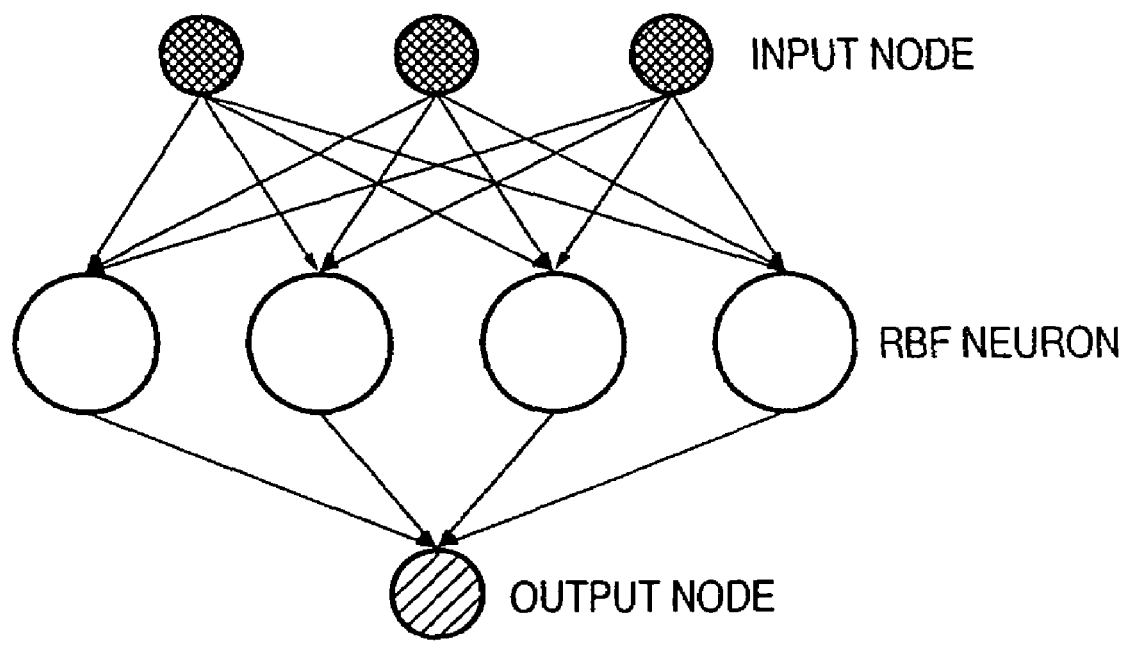
FIG. 6 is a diagram showing a neural network for determining whether the extracted area is or is not a positive test result.

FIG. 3 is a flow chart illustrating steps in a shadow-based diagnostic support process. FIG. 4 is a block diagram showing an internal composition of a shadow extraction unit. FIGS. 5A, 5B and 5C are diagrams illustrating characteristics of the shadow extraction unit. FIG. 6 is a diagram showing a neural network for determining whether the extracted area is a positive test result or not. FIGS. 7A, 7B, 7C and 7D are diagrams illustrating a hypothetical example of the shadow-based diagnostic support process.

As shown in FIG. 3, in a step S31, decoded image data 13 is input to a shadow detection unit for detecting the presence of shadows in the decoded image data 13.

As shown in FIG. 4, a high-frequency image and a low-frequency image are produced from the input image data 13 using a high-pass filter 41 and a low-pass filter 42. An operation part 43 takes the difference between these two images and produces shadow candidate image data 44.

Examples of the characteristics of the high-pas filter 41 and the low-pass filter 42 are shown in FIGS. 5A and 5B. Additionally, the characteristics formed by the difference between the high-frequency image and the low-frequency image are shown in FIG. 5C, which can be thought of as a matched filter for detecting a circular pattern of a given size from the images. In other words, as shown in FIG. 5C, a filter that extracts only an area that corresponds to a given frequency in the image can be understood as in effect extracting only objects of a given size from the image.

As should be clear from the foregoing description, the size of the circular pattern to be extracted can be changed by adjusting the characteristics of the high-pass filter 41 and the low-pass filter 42 used in the shadow extraction process described above. In general, it is very difficult to select and extract tumors having a diameter of 5 mm or less from frontal chest images, because such an image contains a large number of signals of the same size and most of these signals do not indicate an illness. Accordingly, the present embodiment uses a matched filter of approximately 10 mm. However, those of ordinary skill in the art can appreciate that the present invention is not limited to a single diameter of a circular pattern to be extracted by the matched filter. Rather, a plurality of different circular patterns may be used. Thus, by way of illustration only, a series of three different filters for circular patterns of, for example, diameters of 8 mm, 12 mm, and 16 mm, may be used, with the resulting shadow candidates thus extracted being used in later processes.

Next, in a step S32, pathological parameters are calculated for each of the shadow candidates extracted in the shadow extraction process S31 described above. The parameters thus calculated are surface area, circularity and threshold sensitivity, each of which is described in detail as follows. It should be noted that those parameters are calculated for each shadow candidate, and calculation of those parameters requires binarization of the matched filter output image. Through the experiment, the threshold value for the binarization is set to a pixel value corresponding to 10 percent accumulated frequency of the accumulated histogram of pixel values of the matched filter output image.

(1) Surface area S=[number of pixels contained in the shadow candidate]×[surface area of one pixel]

(2) Circularity C=A/S, where A is the overlapping surface area of a circle of actual diameter D and the shadow candidate when the circle is positioned at the center of the shadow candidate.

(3) Threshold sensitivity=|2×S10−S5−S15|

The threshold sensitivity is the change in surface area of the shadow when the threshold value is changed, where S5, S10 and S15 denote changes to the threshold value of 5, 10 and 15 percent, respectively, with the surface area "∥" being expressed as an absolute value.

In a step S33, each of the shadows extracted in step S31 are determined to be either positive or false-positive based on the parameters calculated as described above. "False-postive" as used here simply means that the shadow is not "positive", and no more. It should be noted that although the present embodiment uses three parameters, the present invention is not limited to such a configuration but may be adapted to use more or fewer parameters as required.

Additionally, it should be noted that a determinating part comprising a neural network is used to carry out the determinations made in step S33. A description will now be offered of this determining part, such description being divided between a training phase of such determining part and a utilization phase thereof. Those of ordinary skill in the art can appreciate that the determining part of the present embodiment uses a neural network, the present invention is not limited to such a configuration but can be adapted to suit the purpose of the diagnosis, and thus, for example, and by way of illustration only, may be linearly classifiable. In such a case, it is acceptable to use a linear classification that is simpler and has fewer parameters than that described above.

In the training phase, while the results of the determinations made in step S33 as described above are displayed for the shadows that have been identified as either positive or false-positive the parameters used to make those determinations are input and the neural network internal coefficients are trained. A wide variety of systems have been developed as neural networks. In the present invention, the neural network may be a feed forward-type error reversal neural network such as that developed by D. E. Rumelhart and described in D. E. Rumelhart and J. L. McCleland, Parallel Distributed Processing: Explorations in the Microstructure of Cognition, Vol. 1: Foundation" (Cambridge: The MIT Press, 1986. Alternatively, the neural network may be a Radial Basis Function neural network (hereinafter abbreviated as RBF-NN) such as that described in C. Bishop, "Improving he Generalization Properties of Radial Basis Function Neural Networks", *Neural Comp.*, Vol. 3, pp. 579-588, 1991.

As shown in FIG. 6, the present embodiment uses a triple input node RBF-NN, which has a three-layer structure like that of the Feed Forward type. The three layers are an input layer, an intermediate layer and an output layer. The input layer has as many nodes as the number of parameters extracted in the pathological parameter extraction process of step S32. The RBF neurons of the intermediate layer are equipped with output characteristics so as to have a Gauss distribution as non-linear-type elements. The number of RBF neurons depends on the number of learning cases and the complexity of the problem, but in order to set the calculation time to a reasonable period 100 is a reasonable number. The number of outputs of the neural network is one, with "1" output for a positive and "0" output for a negative. In the present embodiment, although the neural network is tailored to suit the particular purpose of the diagnostic support. However, since the neural network is composed of software in the embodiment, so in actuality the coefficients for all diagnostic supports are held, and the diagnostic support coefficients for a diagnostic support to be performed are set.

In the utilization phase, the internal coefficients that have been learned are set in the neural network in accordance with the purpose of the diagnosis. Thereafter, the determination results specify the three parameters for unknown shadows and the neural network output is obtained. If the neural network has been programmed to output "1" for a positive result and "0" for a negative result, then an output of "0.5" or more is considered positive and an output of less than "0.5" is considered negative, and the appropriate determinations are output. A circular pattern (shadow) determined to be positive is then used in a positive area determination process of a step 34.

The purpose of the positive area determination process in the step 34 is to merge a plurality of adjacent shadow patterns deemed positive into a single positive area, and to form such positive area into a normalized rectangle for the purpose of designating an encoded area. It should be noted that a positive area need not be identified as a normalized rectangle but may be designated with some other shape, so that, for example, if using MAXSHIFT with JPEG2000, it is possible to specify that the area of interest (the positive area) be circular.

Figure 7D:
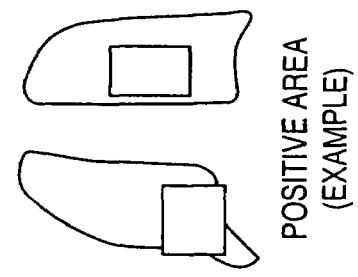
FIGS. 7A, 7B, 7C and 7D are diagrams illustrating a hypothetical example of the shadow-based diagnostic support process.
Figure 7C:
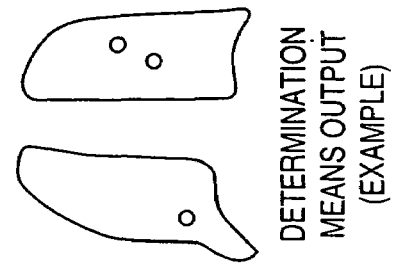
Figure 7B:
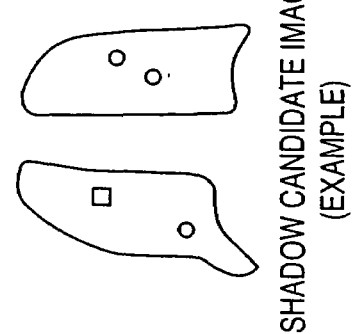
Figure 7A:
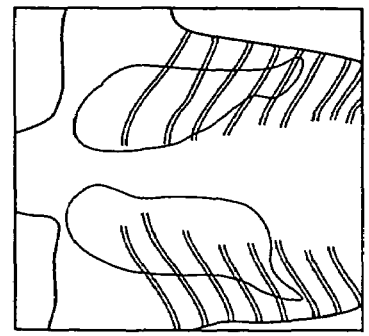

As described above, FIGS. 7A, 7B, 7C and 7D are diagrams illustrating a hypothetical example of the shadow-based diagnostic support process. FIG. 7A shows a frontal chest image, which is input as image data 513. FIG. 7B shows the results of the application of the shadow extraction process of step S31 to the image. The pathological parameter extraction process of step S32 then extracts pathological parameters for each of the (in this case) four shadow candidates shown in FIG. 7B. Next, in step S33, the neural network uses the extracted pathological parameters to determine whether the shadow candidates are positive or negative. The hypothetical case shown in FIG. 7C. indicates a situation in which the neural network determines that three of the four shadow candidates are positive while the fourth candidate is deemed negative and dropped from the display. Finally, FIG. 7D shows the positive shadow patterns resulting from the foregoing image processing, with the additional step of amalgamating the two shadows in the left lung (shown as the right lung in the diagram) into a single positive area.

It should be noted that the prerequisites for such a merge process of a plurality of positive areas into a single positive area as is illustrated here is that any given positive area be within a certain range of another positive area.

As an example of an area merge algorithm, after a certain number of morphological dilations have been carried out the number of individual labeling areas is counted. If the number of individual areas decreases then it is determined that a conjunction has taken place. A region of interest (hereinafter sometimes referred to as an ROI) is then set so as to encompass the original positive areas in the conjoined region, which ROI is then output as FIG. 7D.

A description will now be given of the texture-typed disease diagnostic support, using the example of detection of interstitial pneumonia in a frontal chest image for purposes of illustration only.

Figure 8:
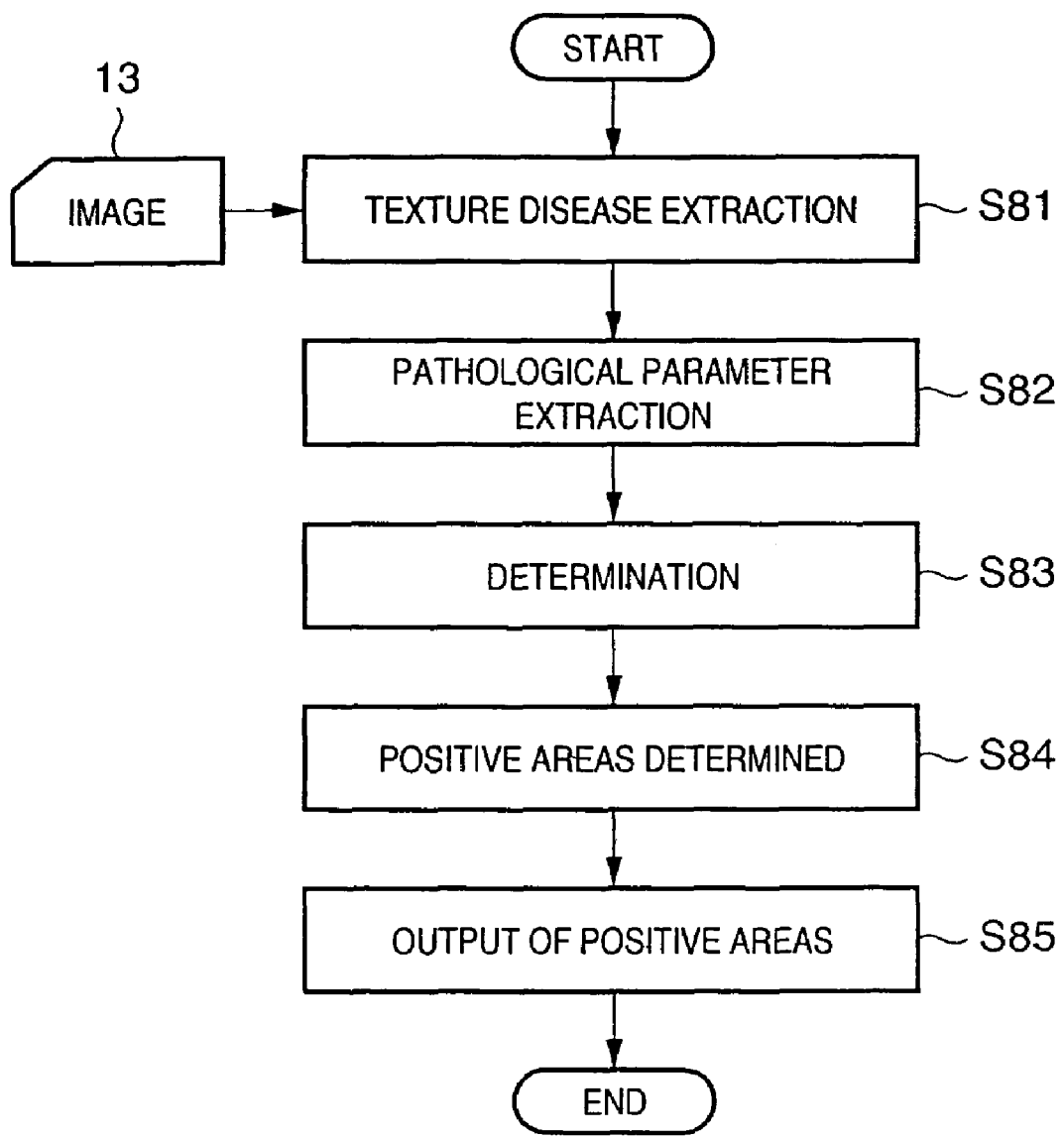
FIG. 8 is a flow chart illustrating steps in a texture disease diagnostic support process.

FIG. 8 is a flow chart illustrating steps in a texture disease diagnostic support process.

Figure 9:
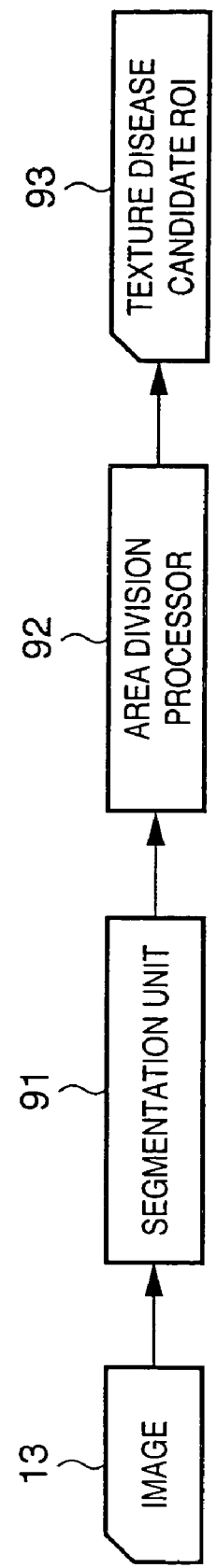
FIG. 9 is a block diagram of a texture disease diagnostic support unit.
Figure 10:
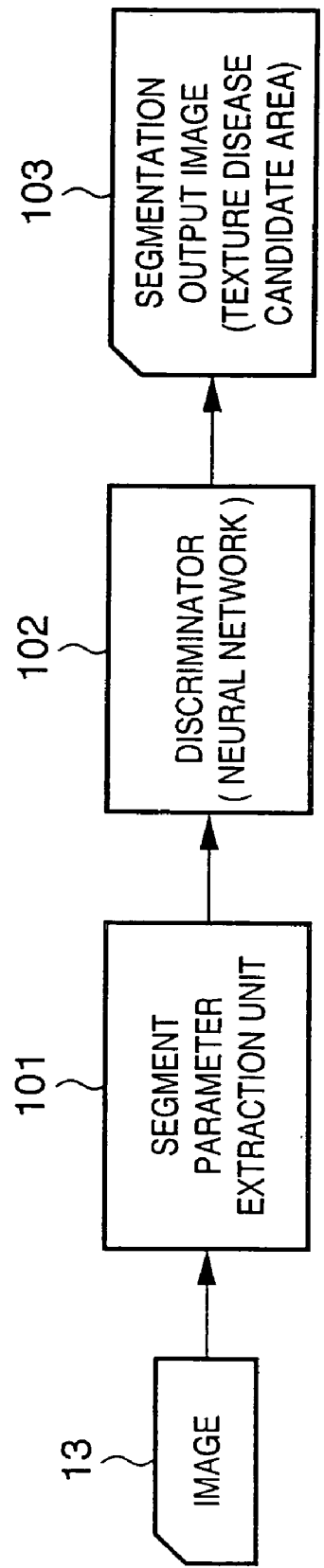
FIG. 10 is a block diagram of a segmentation unit of an image processing apparatus according to the present invention.
Figure 11:
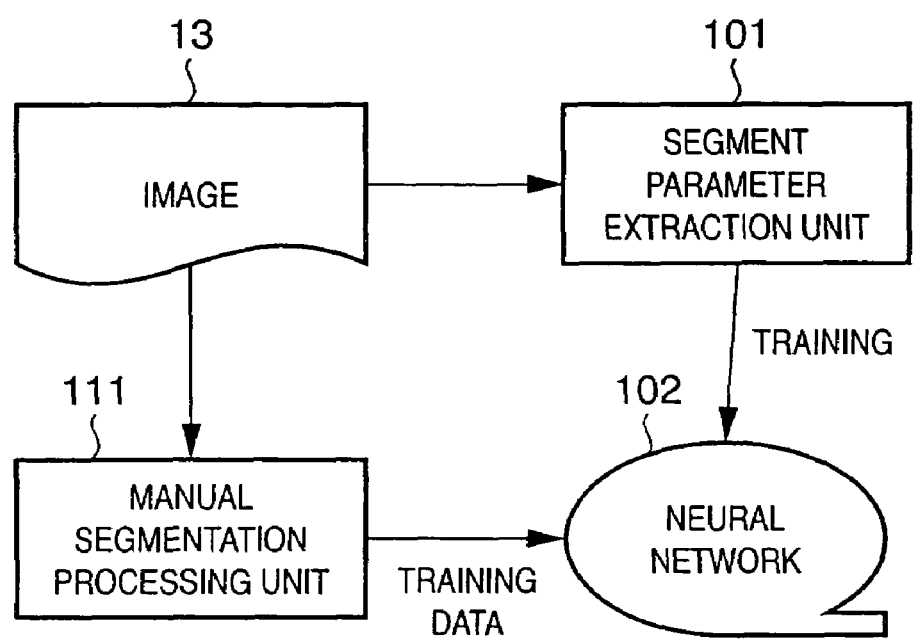
FIG. 11 is a diagram showing the functional composition of the segmentation unit during a training phase.
Figure 12:
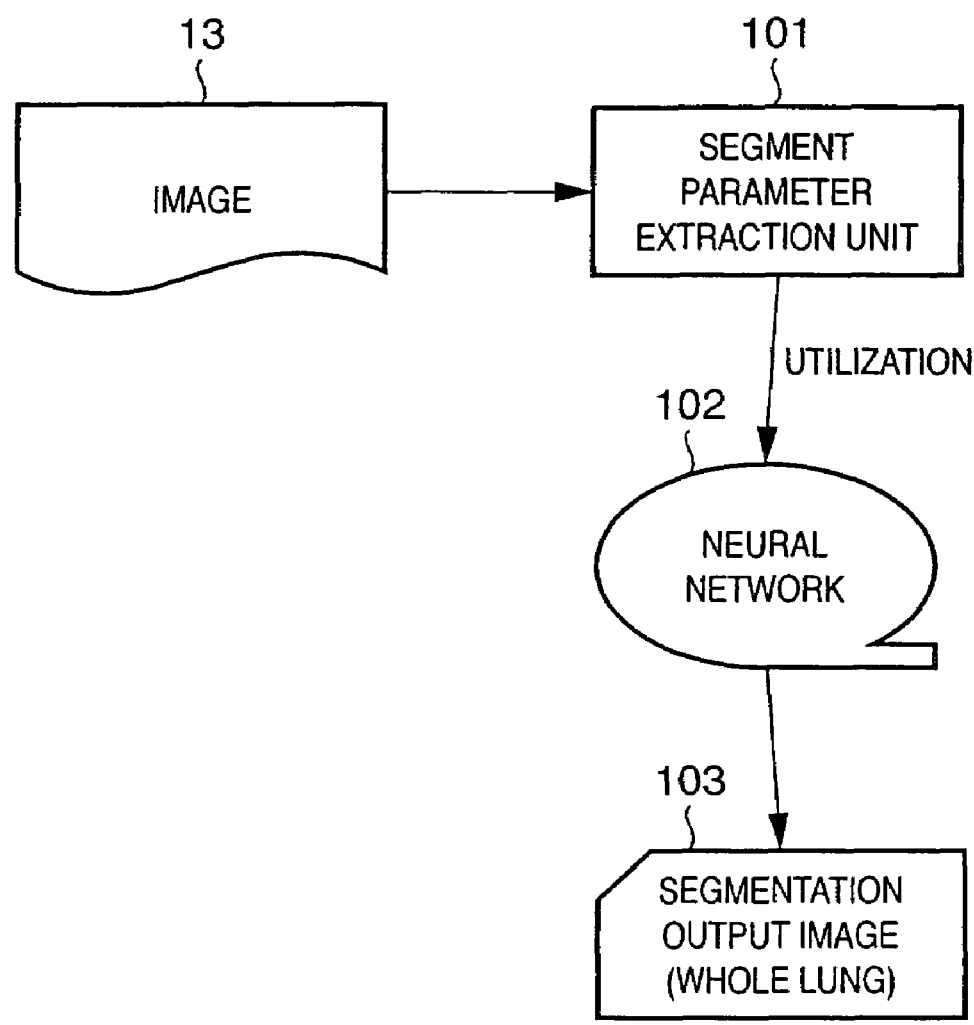
FIG. 12 is a diagram showing the functional composition of the segmentation unit during a utilization phase.
Figure 14A:
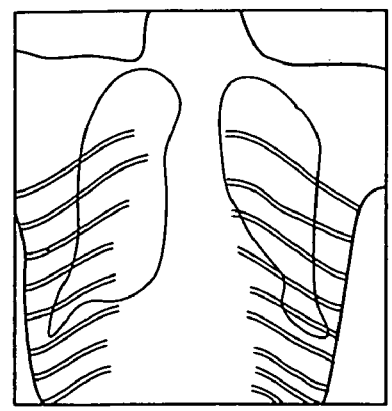
FIGS. 14A, 14B and 14C are specific examples of hypothetical X-ray images.
Figure 14B:
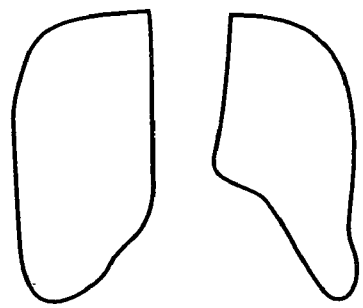
Figure 14C:
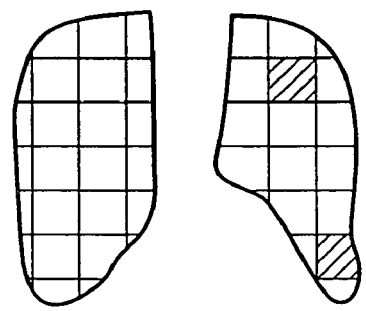

FIG. 9 is a block diagram of a texture disease diagnostic support unit. FIG. 10 is a block diagram of a segmentation unit of an image processing apparatus according to the present invention. FIG. 11 is a diagram showing the functional composition of the segmentation unit during a training phase. FIG. 12 is a diagram showing the functional composition of the segmentation unit during a utilization phase. FIGS. 13A, 13B and 13C illustrate a process of segmentation. FIGS. 14A, 14B and 14C are specific examples of hypothetical X-ray images.

As shown in FIG. 8, in a step S81, texture disease extraction processing is performed on image data 13 output from the decoder unit 12 and a texture disease candidate region of interest (ROI) is extracted. As shown in FIG. 9, the input image data 13 is input to a segmentation unit 91 and the lung region is segmented. With interstitial disease, areas of mediastinal space are not of interest, and unlike shadow pattern detection is determined on the basis of localized areas. Accordingly, the lung image must be extracted in such a way as to show local areas of the lung.

A more detailed description will now be given of the segmentation unit 91, with reference to FIG. 10, which, as described above, is a block diagram of a segmentation unit of an image processing apparatus according to the present invention. In FIG. 10, reference numeral 101 denotes a segment parameter extraction unit, which calculates the parameters for each pixel of the image data 13. Reference numeral 102 denotes a discriminator part, which uses a neural network to identify a disease candidate area.

The composition of the segmentation unit 91 is different for the training phase and the utilization phase. The segmentation unit 91 according to the present embodiment consists of a neural network, so a phase in which practice data is input and the neural network internal coefficients are formed is called the training phase and the phase in which input image data undergoes segmentation is called the utilization phase. Although in the phases discussed below segmentation is carried out in pixel units, those of ordinary skill in the art can appreciate that the present invention is not limited to such a segmentation technique but can be adapted to other segmentation techniques, such as, for example, tracing the contour of the image. A detailed description of such contour tracing is provided in O. Tsujii, M. T. Freedman and S. K. Mun, "Lung Contour Detection in Chest Radiographs Using I-D Convolution Neural Networks," *Electronic Imaging*, 8 (1) (January 1999), pp. 46-53.

As noted above, FIG. 11 is a diagram showing the functional composition of the segmentation unit during a training phase. A segment parameter extraction unit 101 calculates parameters for each of the pixels of an input image. The parameters so calculated may be based on either the pixel value, the texture or the relative address from the anatomical structure. A more detailed explanation can be found in O. Tsujii, M. T. Freedman and S. K. Mun, "Automated Segmentation of Anatomic Regions in Chest Radiographs Using Adaptive-Sized Hybrid Neural Networks," *Med. Phys.*, 25(6), pp. 46-53, June 1998.

Those of ordinary skill in the art can appreciate that the parameters to be used are not limited to those disclosed in the above-described examples and articles, and that the present invention c an be adapted to use other probabilistic parameters such as those described in, for example, F. McNitt-Gray, H. K. Huang and J. W. Sayre, "Feature Selection in the Pattern Classification Problem of Digital Chest Radiograph Segmentation," *IEEE Trans. Med. Imag.*, 14, 537-547 (1995).

Next, a description will be given of the discriminator part 102 (hereinafter also referred to as the neural network). As described above, a variety of systems have been developed for the discriminator part 102 neural network. The present embodiment uses an RBF-NN, adapting the 3-layer structure of the Feed Forward type and, as shown in FIG. 6 and described above, has an input layer, an intermediate layer and an output layer. For convenience, there are three input nodes, four intermediate neurons and one output node.

The input layer has as many nodes as the number of parameters extracted by the segment parameter extraction unit 101. The RBF neurons of the intermediate layer are equipped with output characteristics so as to have a Gauss distribution as non-linear-type elements. The number of RBF neurons depends on the number of learning cases and the complexity of the problem, but in order to set the calculation time to a reasonable period 5,000 is a reasonable number. The number of outputs of the neural network corresponds to the number of segments for each part. Thus, for example, a frontal chest image such as that shown in FIG. 13A has two anatomical segments such as those shown in FIG. 13B, and consequently two output nodes are provided.

In the present embodiment, though the discriminator part 102 of neural network is arranged for every body part (that is, each object image). However, the neural network is composed of software, so in actuality the coefficients for all body parts are held and the coefficients necessary for each body part are set at activation.

In the training phase, parameters for each pixel as well as sample answers (teaching output images) that are segmentation results are presented to the discriminator part 102 neural network. The teaching output image for the input image is provided from a segmentation processing unit 111 (see FIG. 11) in which the segmentation is carried out by human intervention. Thus, the teaching image that corresponds to the input chest image of FIG. 13A is shown in FIG. 13B. In order to accommodate the segment classification that corresponds to the frontal chest image, the segmentation processing unit 111 produces a teaching image having output values "1" and "2". Those areas that are not targeted for segmentation are assigned other numbers besides "1" and "2". Such other number may be zero. The production of the teaching image by the segmentation processing unit 111 can be carried out by computer graphics software capable of specifying an area within the image. Such graphics software may be the commercially available "Photoshop" computer graphics from Adobe Corp. of the United States. Neural network learning, if carried out using the least square method to minimize output error, can be obtained analytically and the internal coefficient calculation can be carried out quickly.

Next, a description will be given of the utilization phase.

As described above, FIG. 12 is a diagram showing the functional composition of the segmentation unit during a utilization phase.

The extraction of parameters for the pixels of the image by the segment parameter extraction unit 101 is carried out in the same manner as for the training phase. The internal coefficient corresponding to the discriminator part 102 neural network is loaded prior to use of the coefficient corresponding to the portion to be photographed. The parameters corresponding to each pixel are presented to the neural network and the neural network outputs an output value to the network output node. In the case of a frontal chest image, there are two output nodes, with the input pixels being classified to the segment that corresponds to the node that outputs the nearest to YES. It should be noted that the coefficient so loaded is acquired by learning by the neural network for each body part. This coefficient originates from the relevant initial values, is matched with a particular photographic portion, a particular diagnostic support, and converged during the learning process. This converged coefficient determines the behavior of the neural network, and typically consists of a plurality of coefficients. It should be noted that the number of coefficients depends on the type and size of the neural network used.

A sample segment image for which classification of all the pixels in an image has been completed in the manner described above is shown in FIG. 13C. In general, the segment image that the discriminator part 102 neural network outputs includes noise. For example, a small surface area of the lung region can become separated from the lung region. This sort of noisy small area can be deleted during downstream processing, a detailed discussion of which is included in the previously mentioned reference, O. Tsujii, M. T. Freedman and S. K. Mun, "Lung Contour Detection in Chest Radiographs Using I-D Convolution Neural Networks," *Electronic Imaging*, 8 (1) (January 1999), pp. 46-53.

The output of the discriminator part 102 neural network of FIG. 10 is a segmentation output image 103. In the case of a chest frontal image this is the lung portion, a sample of which is shown in FIG. 13C.

Next, an area division process 92 (see FIG. 9) is applied to the above-described segmentation output image 103. The area division process is a process that defines a local area for the purpose of calculating texture disease parameters, a specific example of which is depicted in FIGS. 14A, 14B and 14C.

FIGS. 14A, 14B and 14C are specific examples of hypothetical X-ray images. More specifically, FIG. 14A is a chest frontal image, which is input as image data 13 by the segmentation unit 91. The segmentation unit 91 outputs the input image as the segmentation output image 103 shown in FIG. 14B. Applying the area division process 92 to the segmentation output image 103 produces the area-divided image shown in FIG. 14C. That is, the division process divides the target area of the segmentation output image (in this case the lungs) into normalized rectangle sections so that the image acquires a surface area at or below a certain value. A substantially normalized rectangle region of interest defined in such a manner image data 13 called a texture disease candidate region of interest (ROI) 93.

As described above, the output of the texture disease extraction processing of step S81 shown in FIG. 8 is a texture disease candidate (ROI) 93. Pathological parameter extraction is performed in a step S82 on each of the plurality of texture disease candidate ROI 93 to determine whether each of the disease candidate is positive or negative.

The processes downstream of parameter calculation are the same as the shadow diagnostic support process depicted in FIG. 3. That is, normalized rectangle positive regions that include texture-typed disease candidate ROI deemed positive as shown by the hatching in FIG. 14C are defined in steps S83 and S84. The positive regions are then output in a step S85. However, as noted previously, parameter calculation is carried out in accordance with the purpose of the diagnostic support. Specific parameters used for texture-typed disease diagnostic support are described for example in Shigehiko Katsurgawa et al., "The Possibilities for Computer Diagnostic Support for Interstitial Disease", *Japan Radiological Society Journal* 50: 753-766 (1990), and Yasuo Sasaki et al., "Quantitative Evaluation by Texture Analysis of Pneumoconiosis Reference Photographs", *Japan Radiological Society Journal* 52: 1385-1393 (1992).

When, as described above, the diagnostic support unit 16 outputs positive areas 17, such output is input to the input control unit 14 and used to control the image input fro the image input unit 11. The purpose of the input control unit 14 is to read the data for the positive areas 17 (hereinafter also sometimes referred to as regions of interest or ROI) in order to improve the detail of the image of the ROI and thus improve the accuracy of the diagnostic support, or, put another way, to contribute to the display of a more detailed image of the ROI. When improving the accuracy of the diagnostic support, the diagnostic support unit 16 is again applied to the accuracy-improved input image. A description of the input control unit 14 is given below.

The input control unit 14 designates a tile region or a code block region for an ROI and instructs an image server to expedite transfer of the corresponding data. The selective data request to the image server is performed via the image input unit 11, and depending on the configuration of the image server, it is possible to store all codes lossless and to form a layered stream dynamically in response to a request from the image input unit 11.

Figure 15:
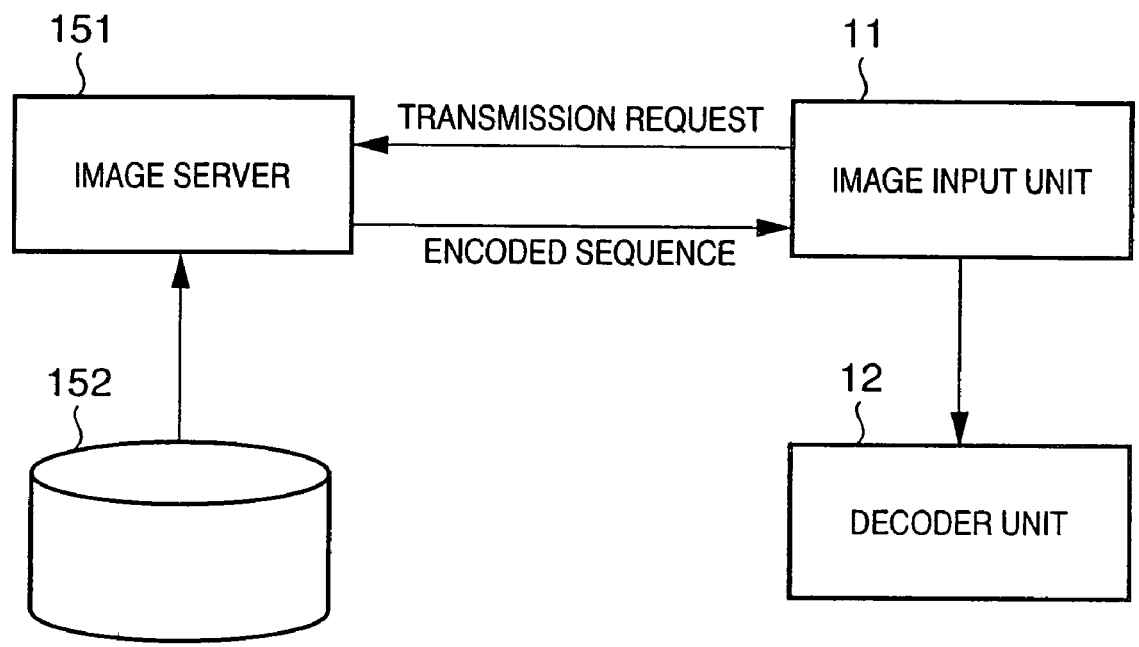
FIG. 15 is a diagram illustrating a process of dynamically generating a code sequence between an image input unit and an image server.

FIG. 15 is a diagram illustrating a process of dynamically generating a code sequence between an image input unit and an image server.

As shown in FIG. 15, the image input unit 11 transmits a request to transmit a position and relevant portion of a ROI within an image to an image server 151. The image server 151 then transmits to the image input unit 11 the necessary portions from a pre-encoded sequence stored in an external storage device 152. A description is given below of outputs of code sequences for ROI produced by the forgoing description.

Figure 16:
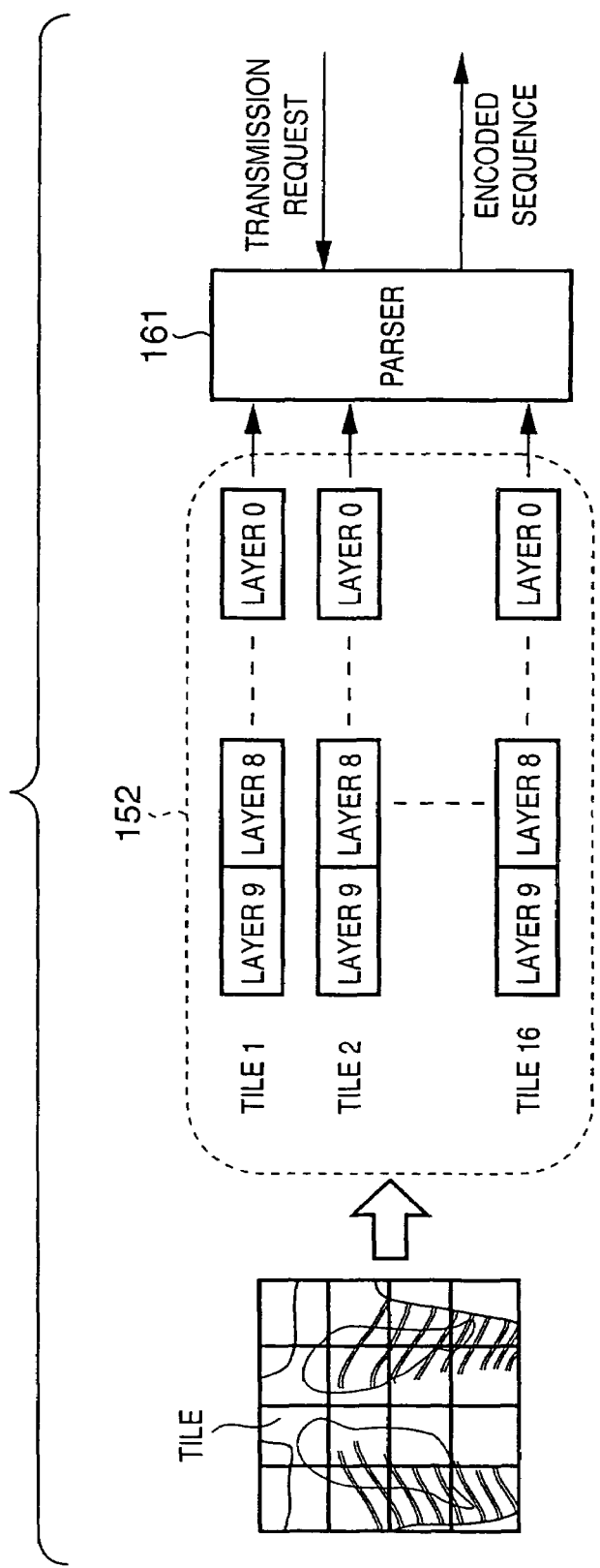
FIG. 16 is a diagram illustrating a process of code sequence transmission where an image is divided into a tile and encoded.

FIG. 16 is a diagram illustrating a process of code sequence transmission where an image is divided into a tile and encoded.

As shown in FIG. 16, the image is divided into a tile of normalized rectangle blocks, with each normalized rectangle tile block being independently encoded and stored in the external storage device 152. The transmission request from the image input unit 11 is input to a parser 161 inside the image server 151. Using the input ROI location information, the parser 161 reads and outputs the code sequence for the tile block that corresponds to the ROI from the external storage device 152.

It should be noted that, as described above, the tile block code sequences consist of a plurality of layers. In the illustrative example depicted in FIG. 16, there are ten layers, number 0 through 9. Accordingly, the output tile block code sequences may consist of encoded data solely of the required layer or of all the layers. The output code sequences are then collected into a single code sequence, into which marker codes are inserted at the head of the tile block encoded data to indicate the beginning of a tile or a tile number.

If no encoded sequences at all have been transmitted prior to the time of the state shown in FIG. 16, then the input control unit 14 instructs the image input unit 11 to input a data stream in accordance with the information volume set by the initial stream setting unit 18. By so doing, the image input unit 11 issues a transmission request to the parser 161 to input layers 9, 8 of all tile blocks. The parser 161 composes layers 9, 8 of the encoded data of all blocks from block 1 though block 16 into a code sequence and outputs that code sequence. Depending on the results of the analysis performed by the diagnostic support unit 16, if, for example, the requested region (region of interest) is block 5, then the input control unit 14 instructs the image input unit 11 to input block 5 first (priority input), causing the image input unit 11 to issue a further transmission request for block 5. Once such a request is received, the parser 161 then assembles all the remaining layers (in this case layers 7 through 0) of block 5 into a code sequence that it then outputs. As a result, all the layers of block 5, the block designated as the requested region of interest, are transmitted while only the necessary minimum number of layers of other blocks is transmitted. Moreover, if the coding is performed reversibly, then the decoded image is of the same picture quality as the original for the ROI block 5 while images of a picture quality adequate for viewing are reproduced for the other blocks.

Those of ordinary skill in the art can appreciate that other, different methods of forming the code sequence can be used, as is described below with reference to FIG. 17.

Figure 17:
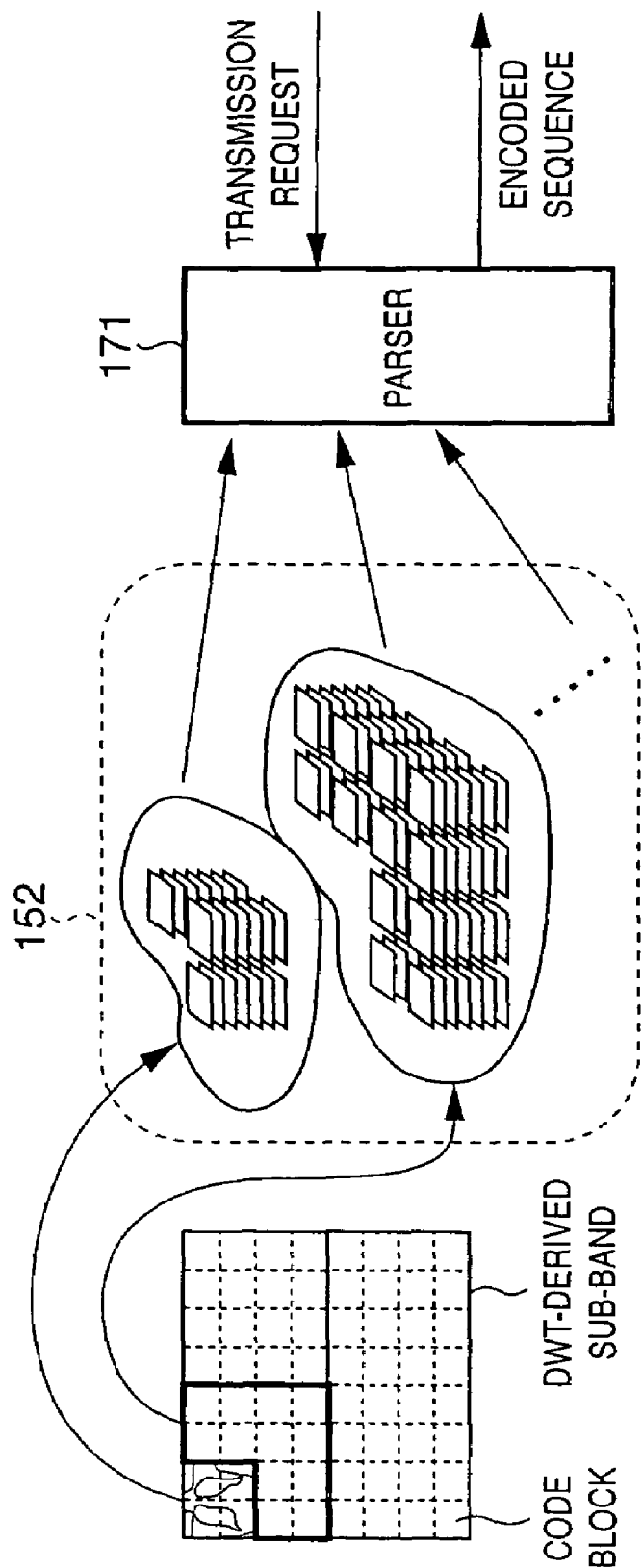
FIG. 17 is a diagram illustrating a process of code sequence transmission where an image has been coded using DWT.

FIG. 17 is a diagram illustrating a process of code sequence transmission where an image has been coded using DWT.

In JPEG2000, the coefficient or quantization index of the sub-band produced by DWT is bit-plane encoded in code block units. In the present illustrative example, the encoded data for the code blocks is stored in the external storage device 152 in a form not composed of encoded sequences.

For the encoded data of the code blocks stored in the external storage device 152 shown in FIG. 17, transmission of the encoded data portion set by the initial stream setting unit 18 has already taken place in accordance with the purpose of the diagnosis. For example, data corresponding to a predetermined bit plane or layer from the top has already been transmitted by the initial stream setting unit 18, and the diagnostic support unit 16 is using the image decoded from the transmitted encoded data to begin diagnostic support processing.

Figure 21B:
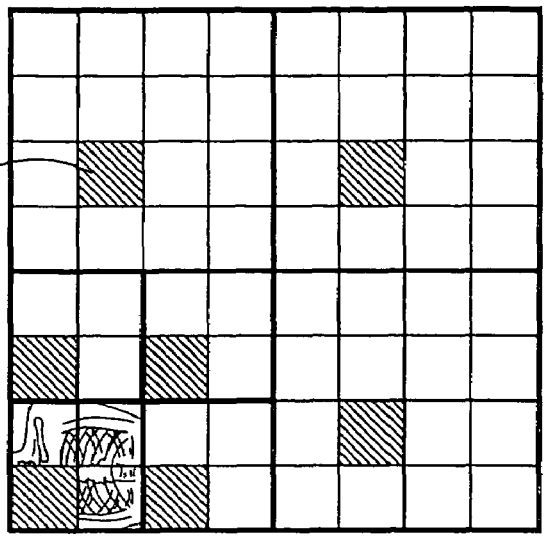
FIGS. 21A and 21B are diagrams illustrating the relation between code block and area of interest.
Figure 21A:
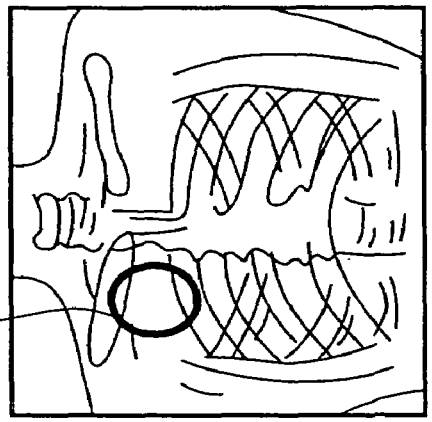

FIG. 18 is a diagram illustrating a hypothetical layering of a JPEG2000 code sequence. FIG. 19 is a diagram illustrating encoded data arranged in layers. FIG. 20 is a block diagram of an image processing apparatus according to an embodiment of the present invention. FIGS. 21A and 21B are diagrams illustrating the relation between code block and region of interest.

Next, where the ROI is output by the diagnostic support unit 16 as shown in FIG. 21A, the input control unit 14 designates code blocks that includes regions of interest as shown in FIG. 21B. In accordance with the designated code blocks, the image input unit 11 outputs a transmission request to a parser 171 to transmit additional encoded data for these designated ROI blocks.

In response to the transmission request from the image input unit 11, the parser 171 composes the encoded data of the code blocks of the regions of interest into encoded sequences for output. For selected code blocks such as those shown in FIG. 21B, all encoded data is transmitted and decoded together with the data previously transmitted so that an image having high picture quality for the ROI can be composed.

As an illustration of the operations described above, in the case of layer 9 of the encoded sequence shown in FIG. 18, only the encoded data for the lower bit planes not previously transmitted would be formed into a new encoded sequence and transmitted. Or, alternatively, by forming and simultaneously transmitting an added layer composed from code blocks adjacent the ROI, it is possible to obtain improved picture quality for images of the ROI and adjacent areas.

Thus, as described above, the parser 171 generates and outputs an encoded sequence, in which, as shown in FIG. 18, the encoded data of the code block for the ROI are positioned in the top layer in response to a transmission request from the image input unit 11. By thus holding encoded data of an intermediate state prior to formation of the encoded sequence in the external storage device 152, the present invention can dynamically generate the appropriate encoded sequences in response to an external request. Accordingly, even where the tile blocks are not formed as described above, it is possible to generate and output encoded sequences of high picture quality for the ROI in response to a request from the image display side.

A supplementary explanation of the layers in JPEG2000 will now be added by way of a coding example.

In JPEG2000, by virtue of its hierarchical encoded data structure which is called layer structure region of interest described above can be encoded first, on a priority basis. FIG. 18, described previously, shows the state of layering at this time. As shown in FIG. 18, code blocks 3 and 4 include the ROI. Based on the input ROI information, an encoded sequence composer 5 then composes an encoded sequence including layer 9 which includes only encoding of the code blocks included in the ROI.

By setting the progressive form of the Layer-Resolution level-Component-Position of JPEG2000, the positions of the layers for all the encoded sequences assumes the form shown in FIG. 19, which, as described above, is a diagram illustrating encoded data arranged in layers, in which only the encoded data of the region of interest is included in the layer 9 positioned at the head of the sequence.

Additionally, by not quantizing during the quantization phase of the encoding process and by forming a predetermined upper layer so as to become an encoded data amount that corresponds to a compression ratio determined in advance, as shown in FIG. 19 the compression ratio can be matched to the layers so as to enable reversible encoding overall. However, for the uppermost layer (that is, for layer 9), in order to include only the ROI the encoded data length differs as the size of the region differs.

Medical images are large, so every detail of the image cannot be displayed for observation o a screen with a limited number of pixels. It is of course possible to determine an area of interest and to enlarge for display just that area, but it is difficult to determine such an area of interest from a small, not very detailed image and so a means for determining such areas of interest automatically instead of by humans is required. The embodiments described above automatically provide high-resolution, detailed display using areas or regions of interest as determined by diagnostic support techniques.

That is, according to the above-described embodiments, diagnostic support for medical images can be carried out using the minimum required amount of data, without reading all the images, and moreover, detailed images of portions deemed positive by the diagnostic support means can be selectively acquired. As a result, efficient data transmission can be carried out and detailed images of important portions can be promptly displayed.

Additionally, according to the above-described embodiments, an initial image of a size and level of detail that is suited to the diagnostic use of the image can be acquired. Thus, for example, in the case of a diagnosis requiring only a rough image the present invention assures that no unneeded data transmission occurs, thereby reducing network traffic and ultimately saving both time and expense.

It should be noted that, where the diagnostic support means shows no areas of concern, an area of interest can be formed by deleting all areas of an irradiated field in which the radiation has passed through the field unchecked, as described previously with respect to an application already filed by the inventors. Additionally, by deliberately failing to set (display) an area of interest, it is possible to provide the attending physician with a clean, that is, an unmarked, image. The advantage of which is that the physician is neither prejudiced by nor (perhaps misleadingly) sensitized to any given area or areas of the image so supplied.

Those of ordinary skill in the art can appreciate that the objects of the present invention are also achieved by supplying a recording medium on which is recorded a software program code for realizing the functions of the above-described embodiments to a system or apparatus, and causing a computer, which may be a CPU or MPU, of such system or apparatus to read and execute the program code stored in the recording medium.

In such a case, in which the program code, as read from the recording medium, achieves the effects of the above-described embodiments, the recording medium itself constitutes the present invention.

Similarly, in such a case, a program code as described above, so as to achieve the effects of the above-described embodiments, itself constitutes the present invention.

Similarly, in such a case, a general-purpose computer, programmed by the above-described program code to become a special-purpose computer achieving the capabilities of the above-described embodiments, itself constitutes the present invention.

A variety of media may be used as the recording media for supplying the program code. These recording media may for example be a floppy disk, a hard disk, an optical disk, a magnetic optical disk, a CD-ROM, a CD-R, magnetic tape, a non-volatile memory card or a ROM.

Those of ordinary skill in the art can appreciate that the effects of the above-described embodiments can be achieved not only by causing a computer to execute the read program code but also includes a case in which an operating system (OS) loaded into the computer carries out some or all of the actual processing based on instructions of the program code, such that the effects of the above-described embodiments are achieved by such processing.

Further, those of ordinary skill in the art can appreciate that the effects of the present invention can also be achieved by the program code read from the recording medium, after being written to a memory in a function expansion board inserted in the computer or a function expansion unit connected to the computer, causing the CPU or the like of such expansion board or expansion unit to carry out some or all of the actual processing based on the program code instructions, such that the effects of the above-described embodiments are achieved by such processing.

Thus, as described above, the present invention makes it possible to priority display an area useful to a diagnosis from encoded image data.

Additionally, present invention makes it possible to priority read an area of interest (AOI) important to the diagnosis or observation as determined by a diagnostic support means and to improve the quality of that image of that area, so as to effectively improve the accuracy of diagnostic support.

Additionally, the present invention makes it possible to acquire image data of an image quality suited to the objective of the diagnostic support and to achieve efficient image transmission.

As many apparently widely different embodiments of the present invention can be made without departing from the spirit and scope thereof, it is to be understood that the invention is not limited to the specific preferred embodiments described above thereof except as defined in the claims.

What is claimed is:

1. An apparatus having an image processing function, comprising:

first acquisition means for acquiring, from a data server, a first portion of data as a data stream obtained from image data that has been sequentially converted and encoded;

decoding means for decoding the data acquired by said first acquisition means and obtaining a two-dimensional image;

analysis means for analyzing the two-dimensional image obtained by said decoding means by providing a medical diagnostic support and determining a region of interest within the two-dimensional image; and second acquisition means for acquiring, from the data server, a second portion of data as a data stream obtained from the image data based on the region of interest determined by said analysis means, wherein a degree of resolution of the image data acquired by said first acquisition means is lower than that of an original image and its spatial resolution and density resolution are determined based on a type of diagnosis, wherein a degree of resolution of the image data acquired by said second acquisition means is higher than that of the image data acquired by said first acquisition means, wherein said second acquisition means specifies a tile region or a code block for the region of interest, and instructs the data server to expedite transfer of the data stream of the specified tile region or code block, and wherein the region of interest is a region deemed to be tested positive based on results of the medical diagnostic support provided by said analysis means.

2. The apparatus according to claim 1, wherein the data stream of the first portion acquired by the first acquisition means corresponds to image quality capable of executing an analysis by said analysis means.

3. The apparatus according to claim 1, further comprising setting means for setting a data volume of the first portion acquired by said first acquisition means according to a diagnostic purpose.

4. The apparatus according to claim 1, wherein said second acquisition means acquires a data stream that expresses details of the two-dimensional image corresponding to the region of interest output by said analysis means.

5. The apparatus according to claim 4, wherein said second acquisition means requests an apparatus that provides the data stream to provide the data stream that expresses the details of the two-dimensional image corresponding to the region of interest output by said analysis means.

6. The apparatus according to claim 1, wherein said second acquisition means acquires a data stream so that an image quality of a region corresponding to the region of interest becomes better than an image quality obtained by the data stream acquired by said first acquisition means.

7. The apparatus according to claim 1, further comprising display means for displaying the two-dimensional image decoded by said decoding means and displaying the region of interest determined by said analysis means.

8. The apparatus according to claim 1, further comprising display means for displaying a two-dimensional image of the data decoded by said decoding means, and displaying the region of interest determined by said analysis means on the two-dimensional image.

9. A method of image processing, comprising:

using a processor to perform the steps of:

a first acquisition step of acquiring, from a data server, a first portion of data as a data stream obtained from image data that has been sequentially converted and encoded, the image data representing an X-ray image;

a decoding step of decoding the data acquired in the first acquisition step and obtaining a two-dimensional image;

an analysis step of analyzing the two-dimensional image obtained in the decoding step by providing a medical diagnostic support and determining a region of interest within the two-dimensional image; and a second acquisition step of acquiring, from the data server, a second portion of data as a data stream obtained from the image data based on the region of interest determined in the analysis step, wherein a degree of resolution of the image data acquired by said first acquisition step is lower than that of an original image and its spatial resolution and density resolution are determined based on a type of diagnosis, wherein a degree of resolution of the image data acquired by said second acquisition step is higher than that of the image data acquired by said first acquisition step, wherein said second acquisition step specifies a tile region or a code block for the region of interest, and instructs the data server to expedite transfer of the data stream of the specified tile region or code block, and wherein the region of interest is a region deemed to be tested positive based on results of the medical diagnostic support provided by said analysis step.

10. The method according to claim 9, wherein the data stream of the first portion acquired in the first acquisition step corresponds to image quality capable of executing an analysis by the analysis step.

11. The method according to claim 9, further comprising a setting step of setting a data volume of the first portion acquired in the first acquisition step according to a diagnostic objective.

12. The method according to claim 9, wherein the second acquisition step acquires a data stream that expresses details of the two-dimensional image corresponding to the region of interest output by the analysis step.

13. The method according to claim 12, wherein the second acquisition step requests an apparatus that provides the data stream to provide the data stream that expresses the details of the two-dimensional image corresponding to the region of interest output by the analysis step.

14. The method according to claim 9, wherein the second acquisition step acquires a data stream so that an image quality of a region corresponding to the region of interest is better than an image quality obtained by the data stream acquired in the first acquisition step.

15. The image processing method according to claim 9, further comprising a display step of displaying the two-dimensional image decoded in the decoding step and the region of interest determined in the analysis step.

16. A program, embodied in a computer-readable medium, that causes a computer to execute an image processing method, the image processing method comprising:

a first acquisition step of acquiring, from a data server, a first portion of data as a data stream obtained from image data that has been sequenced, converted and encoded;

a decoding step of decoding the data acquired in the first acquisition step and obtaining a two-dimensional image;

an analysis step of analyzing the two-dimensional image obtained in the decoding step by providing a medical diagnostic support and determining a region of interest within the two-dimensional image; and a second acquisition step of acquiring, from the data server, a second portion of data as a data stream obtained from the image data based on the region of interest determined in the analysis step, wherein a degree of resolution of the image data acquired by said first acquisition step is lower than that of an original image and its spatial resolution and density resolution are determined based on a type of diagnosis, wherein a degree of resolution of the image data acquired by said second acquisition step is higher than that of the image data acquired by said first acquisition step, wherein said second acquisition step specifies a tile region or a code block for the region of interest, and instructs the data server to expedite transfer of the data stream of the specified tile region or code block, and wherein the region of interest is a region deemed to be tested positive based on results of the medical diagnostic support provided by said analysis step.

17. A computer readable recording medium containing a program that causes a computer to execute an image processing method, the image processing method comprising:

a first acquisition step of acquiring, from a data server, a first portion of data as a data stream obtained from image data that has been sequentially converted and encoded;

a decoding step of decoding the data acquired in the first acquisition step and obtaining a two-dimensional image;

an analysis step of analyzing the two-dimensional image obtained in the decoding step by providing a medical diagnostic support and determining a region of interest within the two-dimensional image; and a second acquisition step of acquiring, from the data server, a second portion of data as a data stream obtained from the image data based on the region of interest determined in the analysis step, wherein a degree of resolution of the image data acquired by said first acquisition step is lower than that of an original image and its spatial resolution and density resolution are determined based on a type of diagnosis, wherein a degree of resolution of the image data acquired by said second acquisition step is higher than that of the image data acquired by said first acquisition step, wherein said second acquisition step specifies a tile region or a code block for the region of interest, and instructs the data server to expedite transfer of the data stream of the specified tile region or code block, and wherein the region of interest is a region deemed to be tested positive based on results of the medical diagnostic support provided by said analysis step.

18. A computer into which a computer-readable recording medium is inserted containing a program that causes the computer to execute an image processing method, the image processing method comprising:

using the computer to perform the steps of a first acquisition step of acquiring, from a data server, a first portion of data as a data stream obtained from image data that has been sequentially converted and encoded;

a decoding step of decoding the data acquired in the first acquisition step and obtaining a two-dimensional image;

an analysis step for analyzing the two-dimensional image obtained in the decoding step providing a medical diagnostic support and determining a region of interest within the two-dimensional image; and a second acquisition step for acquiring, from the data server, a second portion of data as a data stream obtained from the image data based on the region of interest determined in the analysis step, wherein a degree of resolution of the image data acquired by said first acquisition step is lower than that of an original image and its spatial resolution and density resolution are determined based on a type of diagnosis, wherein a degree of resolution of the image data acquired by said second acquisition step is higher than that of the image data acquired by said first acquisition step, wherein said second acquisition step specifies a tile region or a code block for the region of interest, and instructs the data server to expedite transfer of the data stream of the specified tile region or code block, and wherein the region of interest is a region deemed to be tested positive based on results of the medical diagnostic support provided by said analysis step.

* * * * *